(12) United States Patent
Dixon

(10) Patent No.: US 12,263,914 B2
(45) Date of Patent: Apr. 1, 2025

(54) SYSTEM AND METHOD FOR DELIVERING AIR TO A SUBMERGED SHIP SURFACE

(71) Applicant: John Dixon, Fort Lauderdale, FL (US)

(72) Inventor: John Dixon, Fort Lauderdale, FL (US)

(73) Assignee: Airglide, AI. Inc, Tulsa, OK (US)

( * ) Notice: Subject to any disclaimer, the term of this patent is extended or adjusted under 35 U.S.C. 154(b) by 0 days.

(21) Appl. No.: 18/219,375

(22) Filed: Jul. 7, 2023

(65) Prior Publication Data
US 2024/0166306 A1 May 23, 2024

Related U.S. Application Data

(63) Continuation of application No. 18/119,324, filed on Mar. 9, 2023.

(60) Provisional application No. 63/427,144, filed on Nov. 22, 2022, provisional application No. 63/439,306, filed on Jan. 17, 2023, provisional application No. 63/454,549, filed on Mar. 24, 2023.

(51) Int. Cl.
*B63B 1/38* (2006.01)
*B63B 59/04* (2006.01)

(52) U.S. Cl.
CPC .............. *B63B 1/38* (2013.01); *B63B 59/04* (2013.01); *B63B 2001/387* (2013.01)

(58) Field of Classification Search
CPC .............. B63B 1/38; B63B 2001/382; B63B 2001/385; B63B 2001/387; B63B 59/04
See application file for complete search history.

(56) References Cited

U.S. PATENT DOCUMENTS

| | | | | |
|---|---|---|---|---|
| 725,137 | A * | 4/1903 | Quannone | B63B 1/38 |
| | | | | 114/67 A |
| 900,296 | A * | 10/1908 | Motheral | B63B 1/38 |
| | | | | 114/67 A |
| 1,254,892 | A * | 1/1918 | Elniff | B63B 1/38 |
| | | | | 114/67 A |
| 1,408,178 | A * | 2/1922 | Downing | B63H 19/06 |
| | | | | 114/67 A |
| 2,849,941 | A * | 9/1958 | Negoro | B60H 1/249 |
| | | | | 454/120 |
| 3,680,517 | A * | 8/1972 | Morrison | B63B 1/38 |
| | | | | 114/67 A |
| 5,389,022 | A * | 2/1995 | Kobayashi | B63H 21/32 |
| | | | | 440/89 R |

(Continued)

*Primary Examiner* — Ajay Vasudeva
(74) *Attorney, Agent, or Firm* — Origins Law, LLC; Nicholas Spatola

(57) ABSTRACT

This invention introduces a unique two-piece nozzle used to provide air to the hull bottom of a ship, reducing the drag of water friction while in motion. The unique base assembly will mount flush in the bottom portion of a hull of a ship, creating no additional drag when closed. The unique interchangeable and modular nozzle design will allow for maintenance and or development of various designs in the water, without requiring a drydock visit. A flap portion of the nozzle insert will open when air is supplied, releasing small air bubbles to a ship's hull. The flap portion of the nozzle insert may incorporate various materials and passive closing schemes to adjust the air plastron. The present invention creates and maintains an air curtain, called plastron, delivering air underneath a ship hull through an array of nozzles.

26 Claims, 22 Drawing Sheets

(56) References Cited

U.S. PATENT DOCUMENTS

| | | | | |
|---|---|---|---|---|
| 6,957,620 B1* | 10/2005 | Wheeler | .................. | B63B 1/38 |
| | | | | 114/67 A |
| 6,981,460 B1* | 1/2006 | Wheeler | .................. | B63B 1/34 |
| | | | | 114/288 |
| 2014/0230715 A1* | 8/2014 | Kim | ........................ | B63H 1/15 |
| | | | | 114/67 A |

* cited by examiner

SYSTEM AND METHOD FOR DELIVERING AIR TO A SUBMERGED SHIP SURFACE

CROSS-REFERENCE TO RELATED APPLICATIONS

This application is a continuation-in-part of co-pending U.S. patent application Ser. No. 18/119,324, entitled "A System and Method for Reducing Drag on Hulls of Marine Crafts Thereby Increasing Fluid Dynamic Efficiencies", filed Mar. 9, 2023, which claims the benefit of priority pursuant to 35 U.S.C. § 119(e) to U.S. Provisional Patent Application Ser. No. 63/439,306, filed Jan. 17, 2023, and U.S. Provisional Patent Application Ser. No. 63/427,144, filed Nov. 22, 2022. This application also claims priority pursuant to 35 U.S.C. § 119(e) to U.S. Provisional Application Ser. No. 63/454,549, entitled "A System and Method for Delivering Air to a Submerged Ship Surface", filed Mar. 24, 2023. All of which are hereby incorporated by reference in their entireties for all purposes.

FIELD OF THE INVENTION

The present invention relates broadly to methods of enhancing fuel efficiency for marine crafts, specifically, through use of hull air lubrication, and more particularly to an air delivery system for supplying air to a lower surface of a watercraft's hull.

BACKGROUND

As fuel costs fluctuate, technical leaders in the marine industry have directed watercraft design towards more energy efficient practices. Current technology implemented to solve this problem includes advanced hull shapes and designs, antifouling paints, and enhanced efficiency mechanical components. Typically, these technologies are not easily adapted for retrofit purposes. This makes it difficult to expedite fuel efficiency for the shipping industry.

One practice that has resulted from this more energy efficient shift is the theory of using air under a marine craft to provide a low frictional surface that reduces drag on the hull of the marine craft, known as hull air lubrication systems. However, current methods simply flood the area with air bubbles, many of which are wasted because they are too far away from the hull of the surface, and thus, the energy savings are often completely offset by the energy required to run the system. This leads to ship engineers turning the systems off because the use of these systems leads to more maintenance required without an efficiency benefit.

Air lubrication systems are still in a development stage. Current practices call for welding permanent nozzle grates directly into the steel hull of a ship, rendering improvements and/or modifications nearly impossible in water, outside of the 5 year drydock schedule.

Thus, a need exists in the industry for a carefully configured air delivery systems resulting in energy efficient air lubrication, with an efficient method of implementation, and configuration an air distribution system into the hull of a watercraft that results in net fuel efficiency. The present invention addresses the need for a method to economically install and test various air distribution nozzles to gain the maximum efficiency.

SUMMARY OF THE INVENTION

The invention disclosed herein provides air lubrication system nozzle assembly. The air lubrication system nozzle assembly includes a main body having an open cavity therein, wherein the main body includes a gas flow inlet, and an open lower boundary configured to receive a flow modulating nozzle flap. A flow modulating nozzle flap is provided. The flap is configured to modulate a direction and flow rate of a gaseous flow. The main body has at least one longitudinal engagement area, whereby the flow modulating nozzle flap may be coupled. A semi-circumferential flap mounting bracket forming an upper containment limit for the flow modulating nozzle flap is also provided. The air lubrication system nozzle assembly is operable in a submerged environment.

The invention disclosed herein also provides air lubrication system. The air lubrication system includes a superaerophilic inducing surface, a nozzle assembly, and an engaged air layer is created from the gaseous supply directed through the nozzle assembly when pressurized. The superaerophilic inducing surface is mounted at an underside of a hull of a marine craft for use in reducing hydrodynamic drag on the hull of the marine craft. The superaerophilic inducing surface includes a functional surface, wherein the functional surface has a plurality of superaerophilic inducing microscopic and nanoscopic structures etched within the functional surface from laser ablation. Also, each superaerophilic inducing microscopic structure defines a trench and a ridge geometry. Each superaerophilic inducing nanoscopic structure defines a trench and a ridge geometry in a sidewall of each of the superaerophilic inducing microscopic structure.

The nozzle assembly is recessed into the hull of the marine craft and configured to disburse a gaseous supply over the superaerophilic inducing surface. The nozzle assembly of the system includes a main body having an open cavity therein, wherein the main body includes a gas flow inlet, and an open lower boundary, configured to receive a flow modulating nozzle flap. The flow modulating nozzle flap is provided, wherein the flap is configured to modulate a direction and flow rate of a gaseous flow. The main body has a semi-circumferential flap mounting bracket affixed at a border of the open lower boundary, wherein the mounting bracket provides at least one longitudinal engagement area, whereby the flow modulating nozzle flap may be hinged. The semi-circumferential flap mounting bracket forms an upper containment limit for the flow modulating nozzle flap. An engaged air layer is created from the gaseous supply directed through the nozzle assembly when pressurized.

The invention disclosed herein further provides a method for providing air to an underside of a marine craft's submerged hull. The method includes providing an air lubrication nozzle assembly capable of being immersed continuously in a liquid. The air lubrication system nozzle assembly includes a main body having an open cavity therein, wherein the main body includes a gas flow inlet, and an open lower boundary configured to receive a flow modulating nozzle flap. The air lubrication system nozzle assembly also includes a flow modulating nozzle flap, wherein the flap is configured to modulate a direction and flow rate of a gaseous flow. The main body has at least one longitudinal engagement area, whereby the flow modulating nozzle flap may be coupled. The semi-circumferential flap mounting bracket forming an upper containment limit for the flow modulating nozzle flap. As such, the air lubrication system nozzle assembly is operable in a submerged environment.

It is an object of the present invention to provide a system that efficiently uses the principles of air lubrication to maximize the efficiency of the watercraft by reducing drag on the hull.

It is yet another object of the present invention to provide an air lubrication layer under a ship that can maintain its water repellant characteristics even during the movements normally associated with ships moving through both salt water and fresh water conditions, as well as calm and flowing water.

It is a further object to provide an air lubrication system capable of maintaining its efficiency between standard overhauls and drydock maintenance intervals, typically five years.

Another objective of the present invention is to recess a standardized air trunk into the hull of a ship, into which one or plural nozzle actuating devices can be installed and removed with relative ease.

The present invention describes an air distribution assembly with one or more component parts, one of which will allow for the installation, modification, removal and development of air distribution mechanisms that may be bolted directly into the receiver welded into the hull of a ship.

The drawings and specific descriptions of the drawings, as well as any specific or alternative embodiments discussed, are intended to be read in conjunction with the entirety of this disclosure. The invention may be embodied in many different forms and should not be construed as being limited to the embodiments set forth herein; rather, these embodiments are provided by way of illustration only and so that this disclosure will be thorough, complete, and fully convey understanding to those skilled in the art. The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1A:
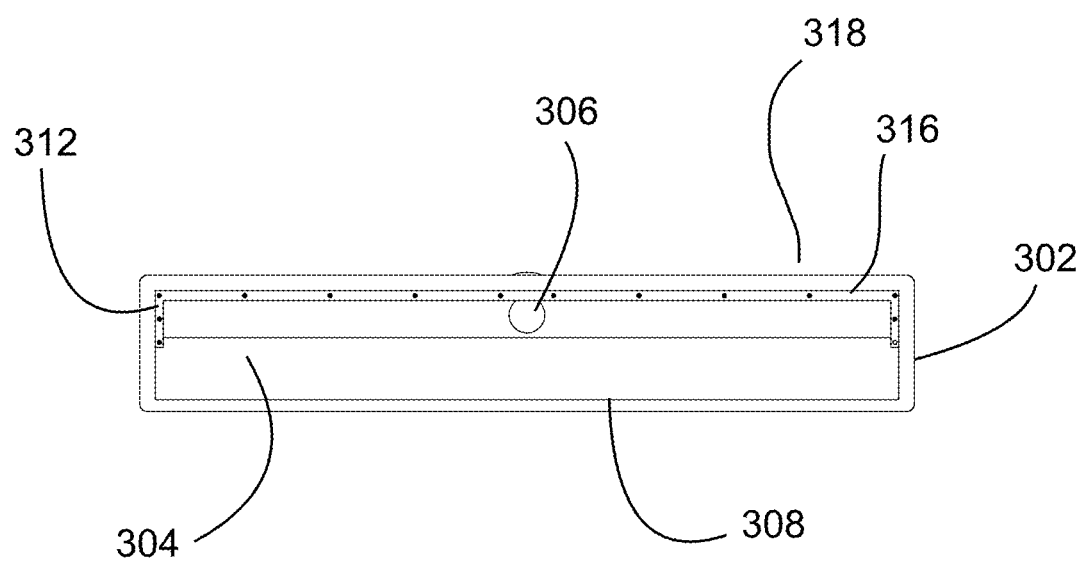
FIG. 1A illustrates a bottom view of the main body of the nozzle system assembly.

The invention disclosed herein provides a system, method, and several apparatuses for delivering air through the hull of a ship onto the bottom portion of a ship hull through a carefully configured nozzle design, creating an air curtain which decreases the frictional drag of a ship as it moves through water. This invention offers increased performance of multiple factors influencing a vessel's efficiency while underway. The efficiency value is realized as lower fuel usage, less carbon emissions, simplified hull maintenance and ultimately lower operating costs.

As the fuel costs fluctuate, technical leaders in the marine industry have directed watercraft design towards more energy efficient practices. One practice that has resulted from this more energy efficient shift is the theory of use of air under a marine craft to provide a low frictional surface that reduces drag on the hull of the marine craft. However, current methods use open grates that simply flood the area with air bubbles, many of which are wasted because they are supplied as a deluge and the bubbles migrate too far away from the hull of the hull surface, and thus, the energy savings is often completely offset by the energy required to run the system. This leads to ship engineers turning the systems off because the use of these systems leads to more maintenance required without an efficiency benefit.

The invention herein provides a solution for these issues by incorporating a unique air distribution nozzle that minimizes water friction drag and controls the output of lubricating air based on the velocity of a ship with the invention installed. Distributing air to a hull surface immersed continually in a liquid is achieved by introducing an array of nozzles throughout a ship hull bottom surface. The nozzles have the ability to close automatically, and open when supplied with pressurized air. An air distribution system without a means to close the air distribution port will create undue drag when a ship is underway, when not releasing the friction reducing air bubbles.

The nozzle system includes a nozzle assembly with a main body having a cavity for receiving an air supply from a feed pipe, whereby the air supply is diffused in the cavity uniformly, whereby the air supply flow approaches a closeable lower opening. A flap at the closeable lower opening modulates the flow of air out of the nozzle. Thus, the invention includes a configured recessed nozzle assembly having a flush flap capable of solving the above issues.

Another major issue that plagues current nozzle designs in the industry is the creation of oscillations during air delivery that mimic wave patterns. The Kelvin-Helmholtz instability properties, or the instability that can occur at the interface between two fluid layers of different densities and velocities when there is a velocity shear between them, can be a major problem for watercraft implementing air nozzles. This oscillation defeats the intention of keeping the supplied air close to a ship hull for maximum efficiency. The design of the nozzle, disclosed herein, reduces oscillation of the released air onto the hull of a ship because of the narrow gap between the nozzle flap and the upper boundary, whereby the disbursed air forms a thin film which does not create turbulence.

To achieve nozzle activation, one or more air compressors within a ship will supply pressurized air to the nozzle, opening one or more flap mechanisms affixed onto the nozzle assembly main body, and distributing the small air bubbles to the hull on the underside of a ship, creating what is known as an air plastron (the air between water and a ship hull surface). The nozzle also supports an engaged air layer under the hull once the air plastron is created, as long as the nozzle is pressurized.

For a wetted surface to move more efficiently in water, this air plastron (an air layer) can be used. The efficiency of the air delivery system is dependent on minimizing the amount of excess air bubbles created. Over supply of air bubbles equates to overuse of energy to create those bubbles. The air plastron acts as a slippery layer thus reducing the solid-liquid interface of the hull surface. As the solid-liquid interface decreases, the frictional adhesion of water to the hull surface drops causing reduced water drag.

In an underwater environment, the air plastron experiences a gradual reduction of volume due to external hydrostatic pressure and a convection-diffusion mechanism. This invention actively replenishes the air plastron by pneumatically supplying air to a ship's hull bottom through unique nozzles in the bottom of the hull surface, thereby sustaining the air plastron immersed in water. Air used to replenish the air plastron may also be enriched with carbon molecules to accelerate and enhance the creation of drag reduction properties.

My previous patent application U.S. Ser. No. 18/119,324, entitled "A System and Method for Reducing Drag on Hulls of Marine Crafts Thereby Increasing Fluid Dynamic Efficiencies", discloses creation of an air plastron using a constructed surface, which acts to attract air and repel water from the surface of the hull of a marine craft, all of which are incorporated in its entirety, herein.

For this implementation, one must appreciate the physics behind air plastron creation. Water is 50 times more dense than air. Up to 90% of the drag on a ship comes from friction on the hull due to water density. A layer of air between a ship hull and the water a ship moves through can decrease that drag by up to 70%. The main elements opposing the movement of a ship through water are bow pressure, hull friction and the wake created as a ship moves through water.

This invention herein discloses a way to actively supply air to the plastron with the goal of reducing water friction using the structures and principles disclosed herein. Millimeter sized air bubbles shall be pneumatically delivered through one or more of these nozzles from a supply of compressed air within a ship. The pressure of compressed air shall be greater than that of the hydrostatic pressure of the water pushing up against the bottom of a ship equipped with said invention. The volume of supplied air will vary with the conditions of travel, including but not limited to sea state, speed through the water and water temperature.

With respect to the effects of delivering air to the nozzles, as more air is delivered to the nozzles the pressure in them will increase and the movable flap will open to accommodate the increased pressure. The closer that pressure is to the opposing hydrostatic pressure, the slower the diffusion of air from the cavities will be. If the rate at which the air is delivered is equal or greater than the rate of diffusion, the air plastron will remain stable and be sustained over time.

The nozzle design opens only when lubricating air is desired, and stays closed when not in use, automatically adapting to the needs of a ship. When not in use, the unique nozzle design is flush to a ship's hull and will not cause additional friction loss as with other nozzle designs. In use, the nozzle is designed to adjust itself to the conditions of ship speed and air released through the nozzle.

In some embodiments, a compressor puts out enough force to create a 3-psi difference between the combined hydrodynamic forces and the spring force of the self-closing means acting upon a lower surface of the flap, and the force of air coming through the feed pipe pushing against the upper surface of the flap, which will create a narrow longitudinal gap for an optimum gaseous flow to escape. This psi may be modified and independently configured for higher or lower psi to provide maximum efficiency for each application.

The nozzle includes a recessed portion, sometimes referred to as a sea chest or weldment. While sea chests are typically associated with receiving material, such as water with a seawater cooling circuit, the current sea chest defines a constructed cavern, or cavity, for diffusion of air or other gaseous output. This operation is more similar to what is commonly referred to as an air dispenser. However, the gaseous output in this application is forced through a linear nozzle opening. In some embodiments, the nozzle will be attached to an air accumulation tank to provide equal air delivery pressure across the width of the nozzle. An advantage of the use of a linear nozzle opening is the result in making the nozzle outlet aspect ratio wider than it is long, extending the distribution of bubbles along the axis of a ship. If an air accumulation tank is used, the air accumulation tank may incorporate internal air deflectors to distribute supplied air equally within the air accumulation tank. The overall body of the nozzle assembly includes multiple options for self-closing mechanisms for constricting the output size of the nozzle or closing the nozzle altogether.

The nozzle design includes a flap. The flap may be constructed of a semi-rigid material, which allows the flap to flex in some embodiments, but keep the flap substantially planar. Flaps may be constructed of metal, rubber, or both in some embodiments, to create a surface flush to a ship bottom and opening as required to become operational. Flaps may also be constructed of composites, resins, polymers, or the like. It is also to be appreciated that these materials allow the flap to return to its original positioning when not in use, without requiring mechanical actuation means.

Some of these mechanisms for self-closing the nozzle flap, by way of example and not limitation, include springs, vacuum pressure, and/or a counterweight which will close the nozzle in the absence of air pressure. Additionally, flaps may be fixed to the cavity, creating a reed valve, where the force of the air presses on the flap, thereby flexing an otherwise rigid surface. All of these embodiments involve creating a nozzle that becomes operational once air pressure is supplied to that nozzle. That is, the flap portion of the nozzle will return to non-operational position by use of counterweights, springs, or by use of other passive means including the tendency of the material used to resist bending and flexing.

An additional feature of this invention is its modifiable construction, which allows for development and upgrades to the flap mechanism without taking an equipped ship, out of the water, as is currently the case with other air lubrication system designs. As technology changes, more efficient designs may emerge. Permanently installed nozzles may become obsolete. The system disclosed herein allows for an exchange of air distributing nozzles within the recessed body, even though the recessed body may be permanently welded into a ship's hull.

The system and method of the present invention of delivering air to a constructed nozzle may be used to provide a system that efficiently uses the principles of air lubrication to maximize the efficiency of the watercraft by reducing drag on the hull. The present invention may be used to provide an air lubrication system capable of lasting for at least five years during the service life of a marine craft between overhauls and drydock maintenance. This system and apparatus, and thereby method, are particularly shown in FIGS. 1A-14.

Figure 1B:
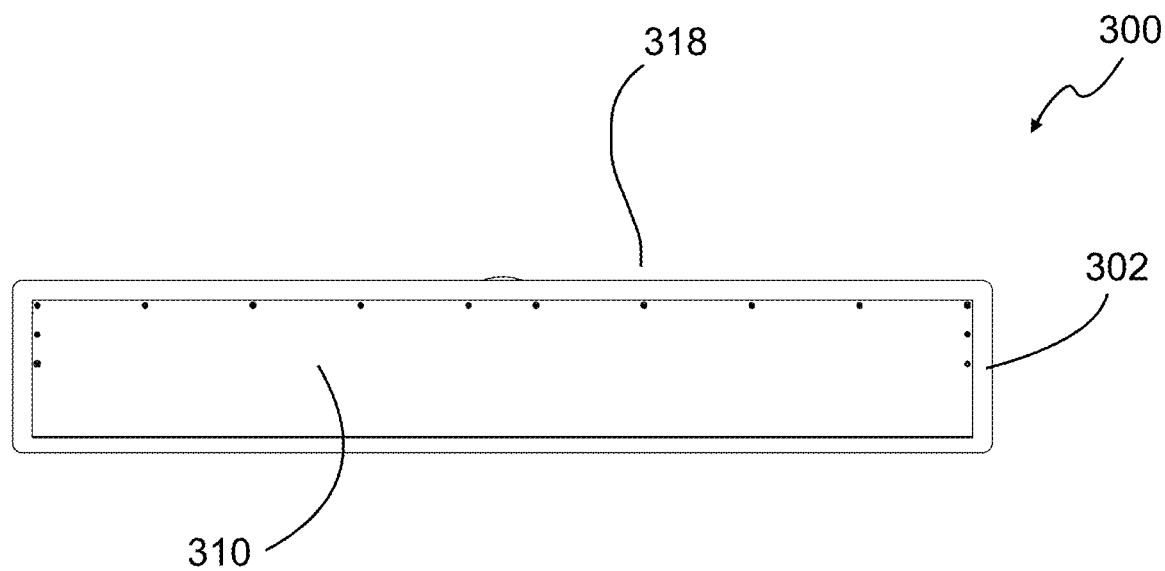
FIG. 1B illustrates a bottom view of the nozzle system assembly showing the nozzle flap installed.

FIG. 1A illustrates a bottom view of the main body 302 of the nozzle system assembly. As may be appreciated, the illustration also shows the nozzle cavity 304, gas flow inlet 306, semi-circumferential mounting bracket 312 with longitudinal engagement area 316 at a forward area of couplement 318. FIG. 1B illustrates the same bottom view of the nozzle system assembly 300 showing the nozzle flap 310 installed.

Figure 2:
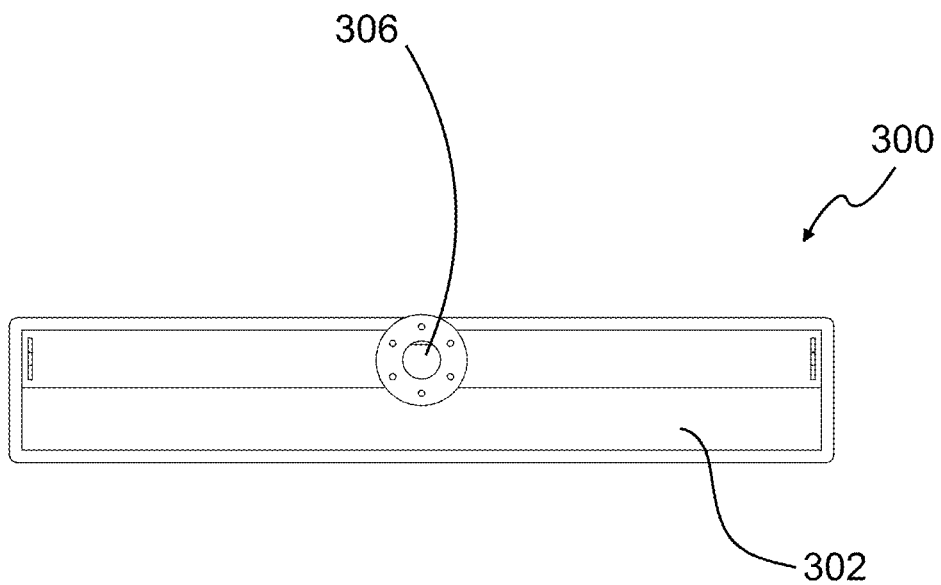
FIG. 2 illustrates a top view of the nozzle system assembly.
Figure 3:
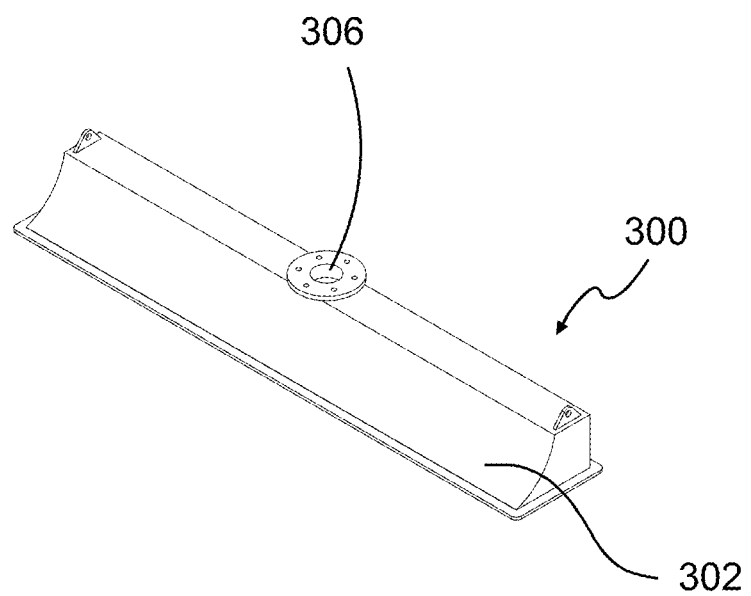
FIG. 3 illustrates a top perspective view of the nozzle system assembly.

FIG. 2 illustrates a top view of the nozzle system assembly 300, whereon the top of the gas flow inlet 306 can be seen. FIG. 3 illustrates a top perspective view of the nozzle system assembly 300.

Figure 4:
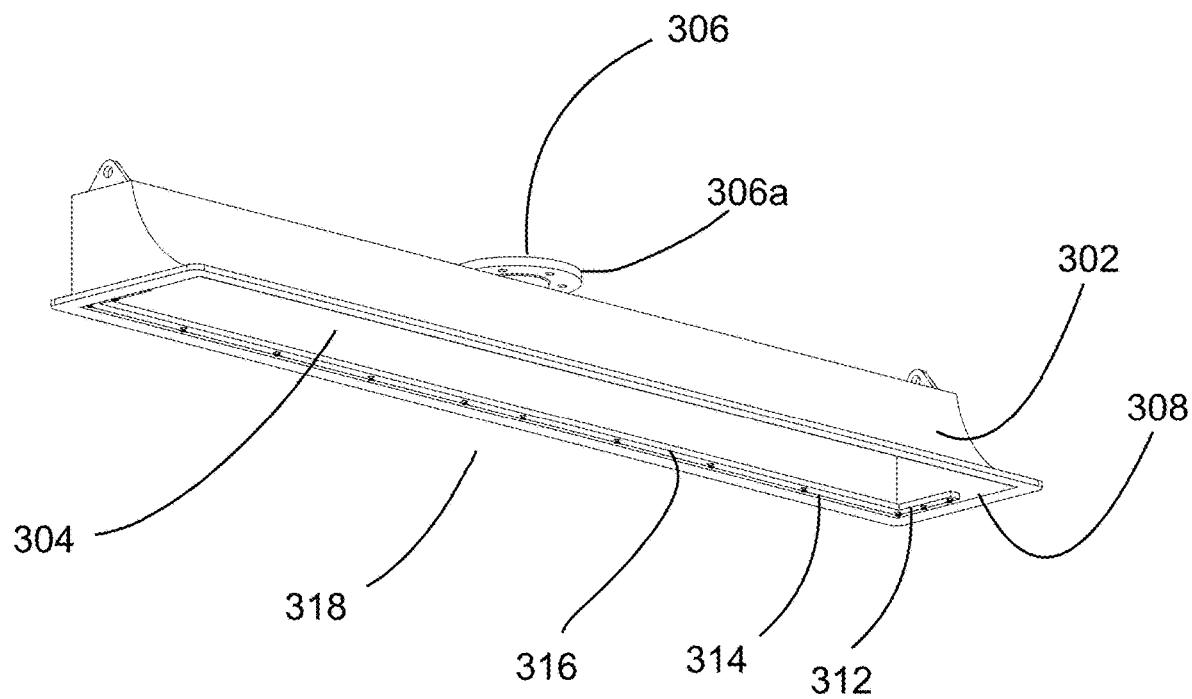
FIG. 4 illustrates a bottom perspective view of the main body of the nozzle system assembly.
Figure 5A:
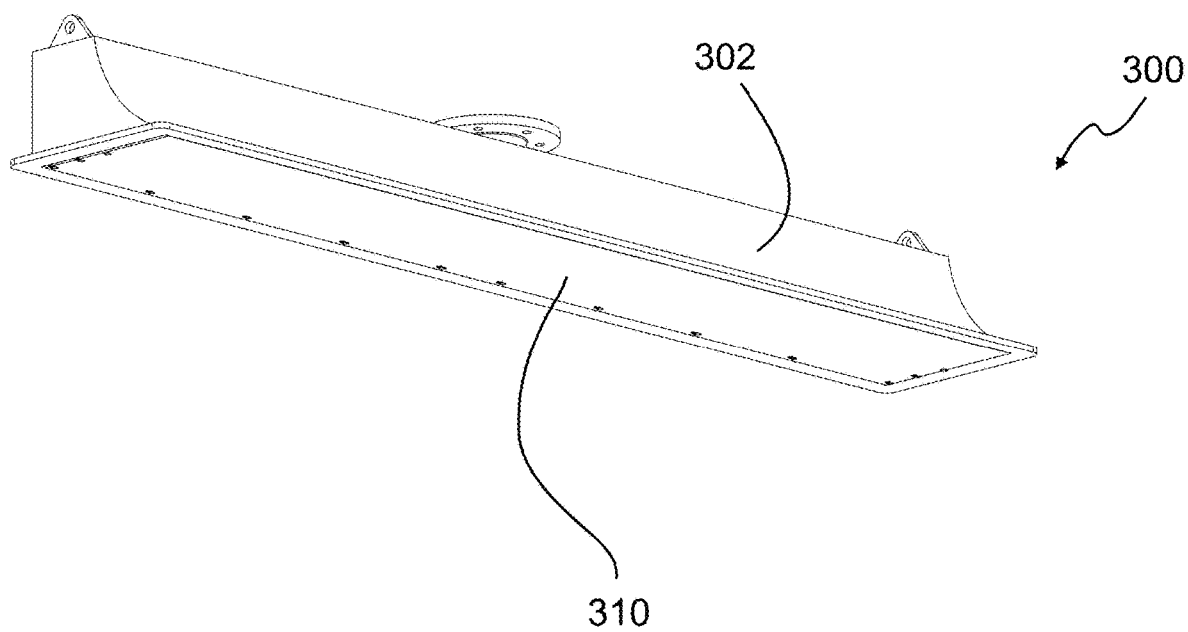
FIG. 5A illustrates a bottom perspective view of the nozzle system assembly, showing the nozzle flap closed.
Figure 5B:
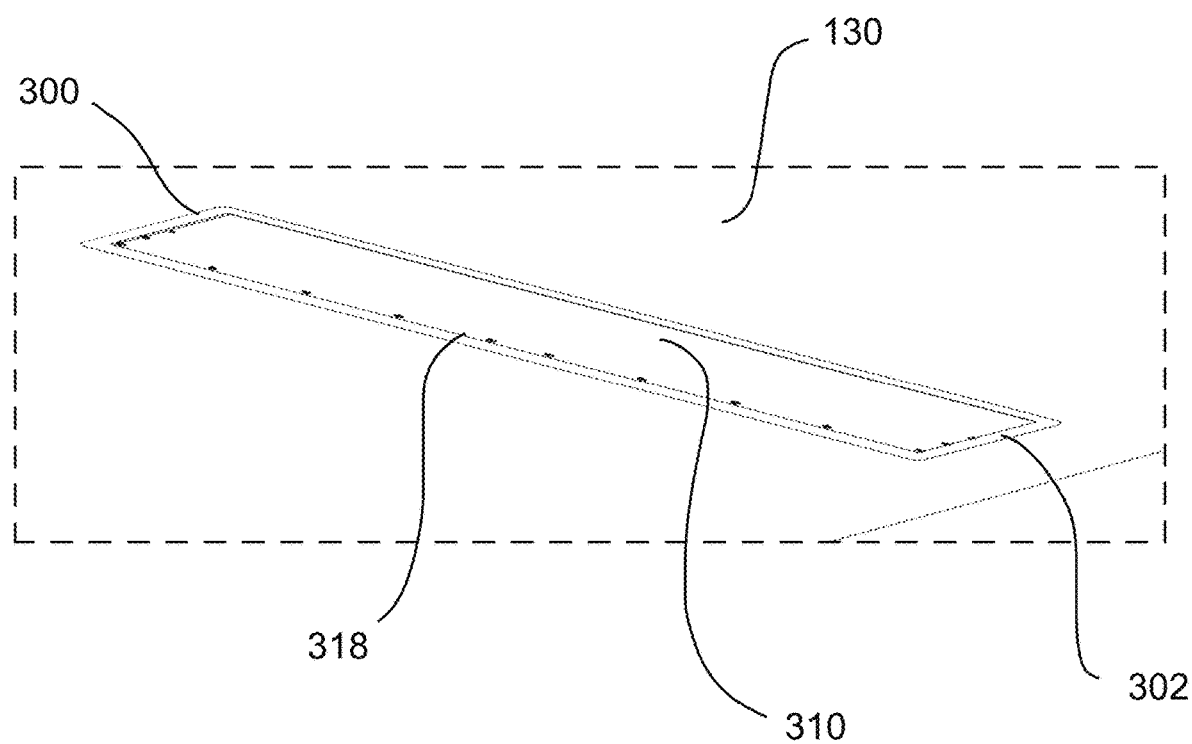
FIG. 5B illustrates a bottom perspective view of the nozzle system installed flush into the hull of a watercraft, with flap closed.
Figure 6A:
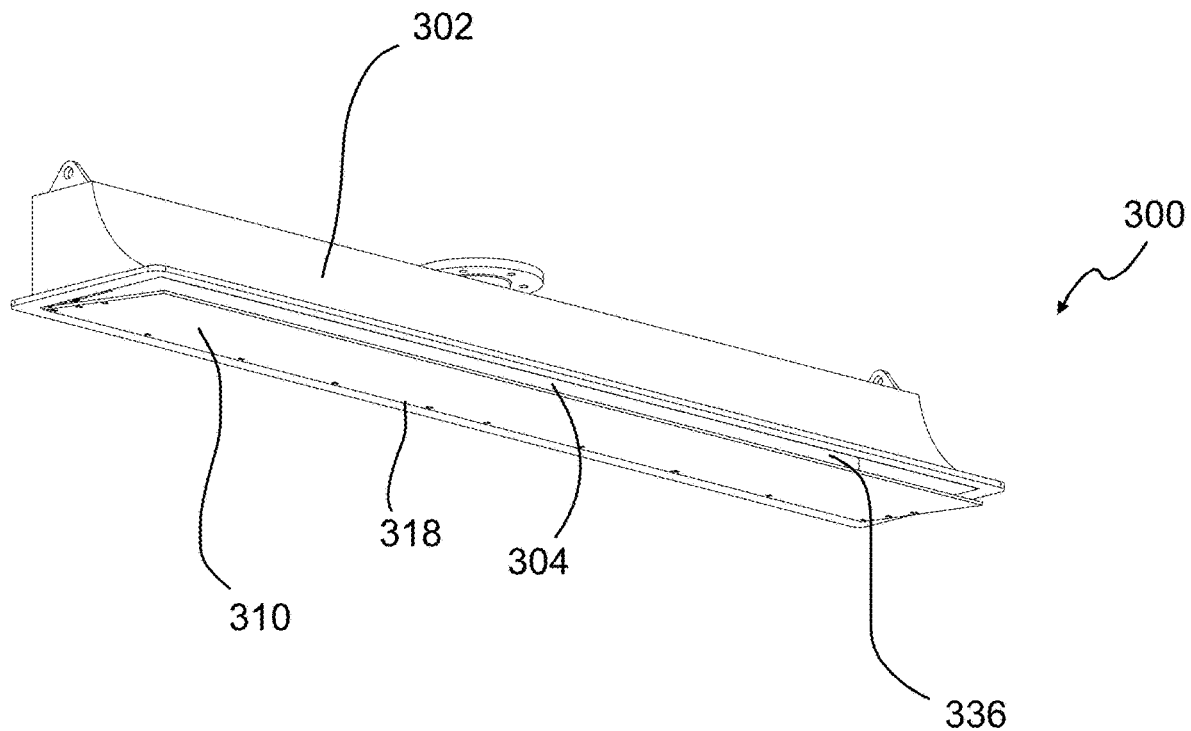
FIG. 6A illustrates a bottom perspective view of the nozzle system assembly, showing the nozzle flap open.
Figure 6B:
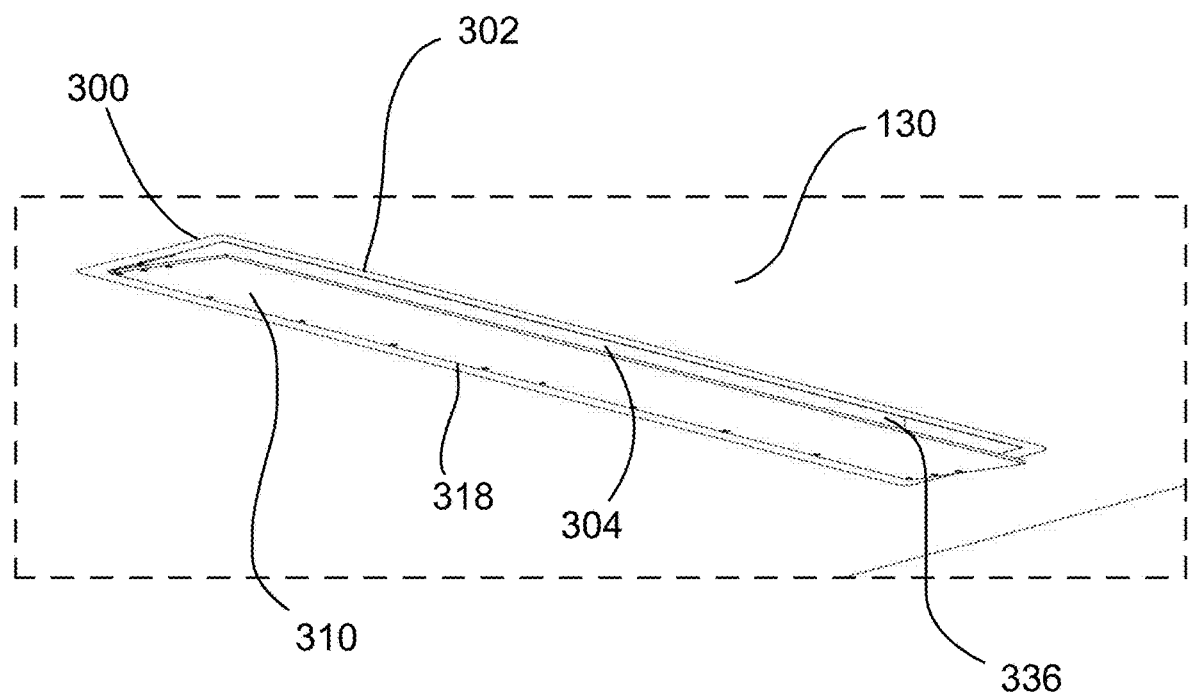
FIG. 6B illustrates a bottom perspective view of the nozzle system installed flush into the hull of a watercraft, with flap opened.

FIG. 4 illustrates a bottom perspective view of the main body 302 of the nozzle system assembly without a flap installed. As may be appreciated, the illustration also shows the nozzle cavity 304, pipe coupling 306a of the gas flow inlet, semi-circumferential mounting bracket 312 with longitudinal engagement area 316 at a forward area of couplement 318. FIG. 5A illustrates a similar bottom perspective view of the nozzle system assembly 300, showing the nozzle flap 310 installed and closed. FIG. 5B illustrates a bottom perspective view of the nozzle system 300 installed flush into the hull 130 of a watercraft, with flap 310 closed. As shown in FIG. 5B, the open lower boundary 308 is flush with the transverse horizontal plane of the submerged hull 130 of a ship surrounding the open lower boundary 308. FIG. 6A illustrates a bottom perspective view of the nozzle system assembly 300, showing the nozzle flap 310 open, thereby creating and demonstrating the longitudinal nozzle opening 336, whereby the internal cavity 304 of the main body 302 can be seen. Also demonstrated is the forward area of couplement 318. FIG. 6B illustrates a bottom perspective view of the nozzle system 300 installed flush into the hull 130 of a watercraft, with flap 310 opened, hinged at the forward area 318.

Figure 7A:
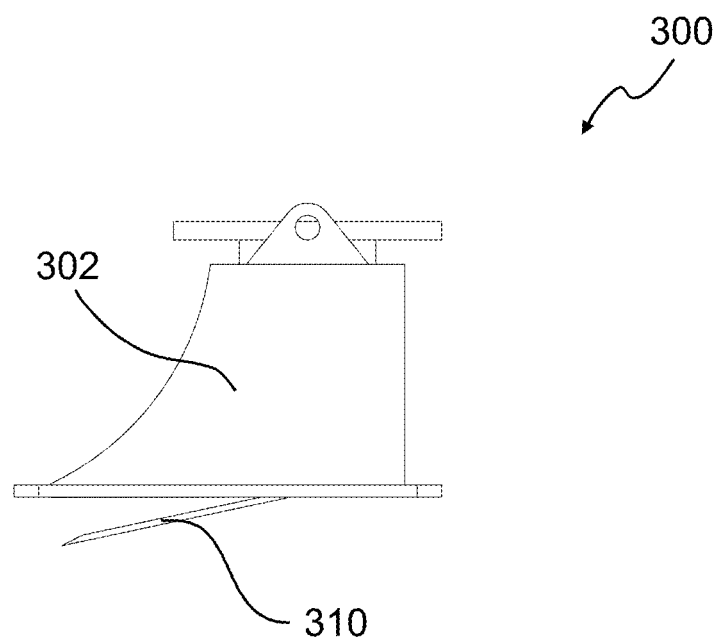
FIG. 7A illustrates a side view of the nozzle system with flap opened.
Figure 7B:
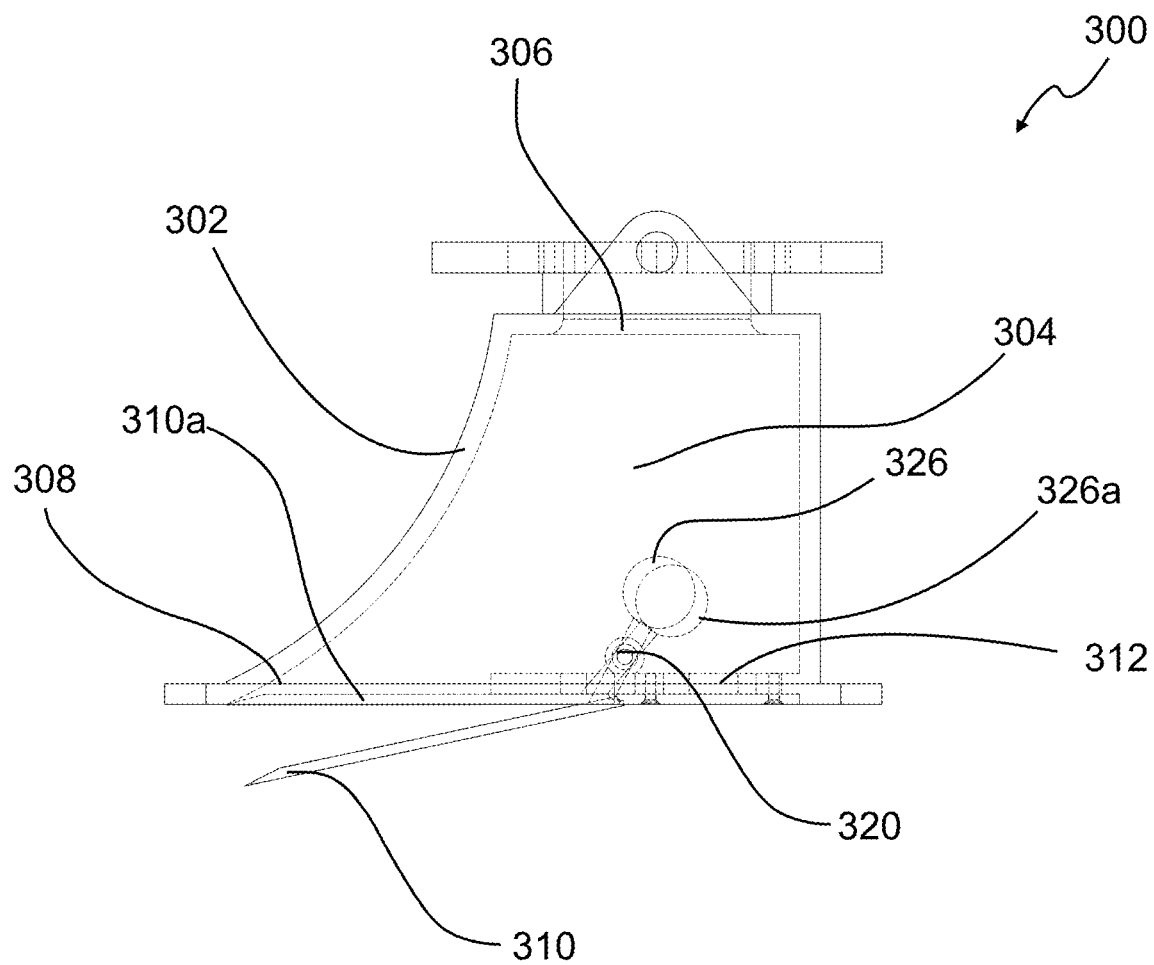
FIG. 7B illustrates a side view of a counterweight-type embodiment of the nozzle system, similar to that in FIG. 7A, with internal components shown in phantom.

FIG. 7A illustrates a side view of the main body 302 of the nozzle system 300 with flap 310 opened. FIG. 7B illustrates a side view of a counterweight-type embodiment of the nozzle system 300, similar to that in FIG. 7A, with internal components, including counterweight 326/326a in open and closed positions, flap 310a in closed position, mounting bracket 312, gas inlet 306, and internal cavity 304, shown in phantom. The flap 310 is shown open in non-phantom.

Figure 7C:
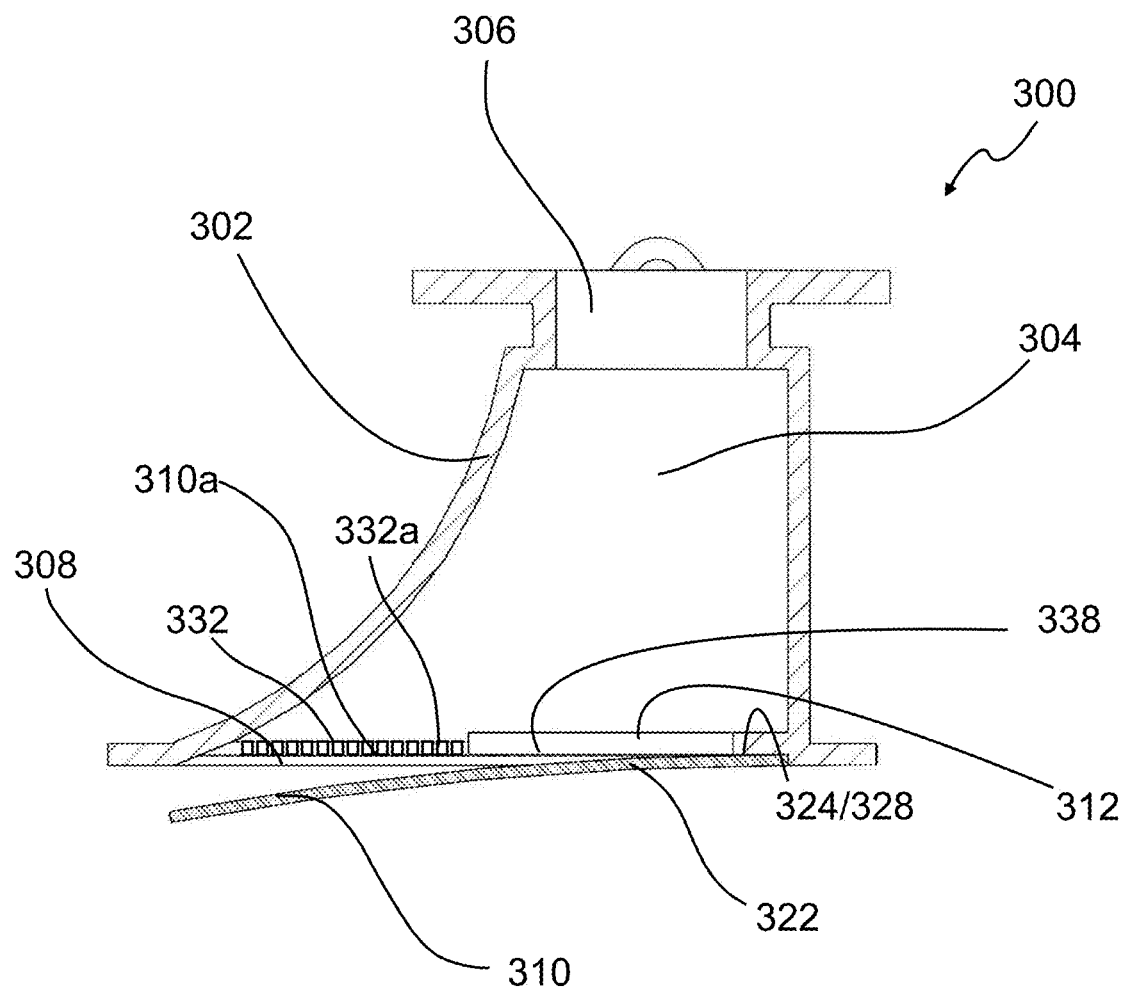
FIG. 7C illustrates a cross-sectional side view of an embodiment of a reed-type embodiment of the nozzle system with flap opened and a screen mesh at an opening.

FIG. 7C illustrates a cross-sectional side view of an embodiment of a reed-type embodiment of the nozzle system 300 with flap 310 opened and a screen mesh diffusion panel 332 at an opening 308. Also shown is the mounting bracket 312, internal cavity 304, and gas inlet 306.

Figure 8A:
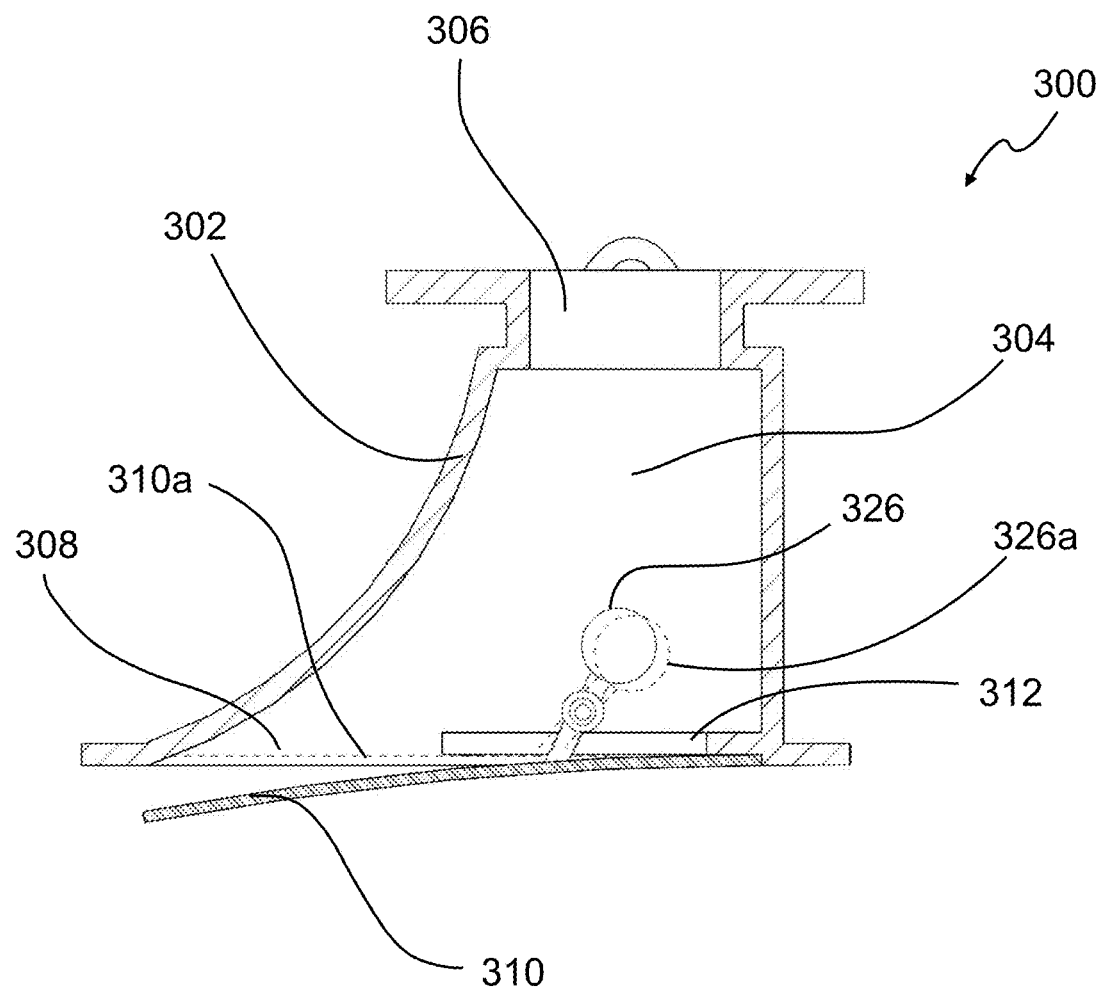
FIG. 8A illustrates a cross-sectional side view of the nozzle system assembly of the nozzle system, similar to that in FIG. 7B, with a counterweight-type flap.
Figure 8B:
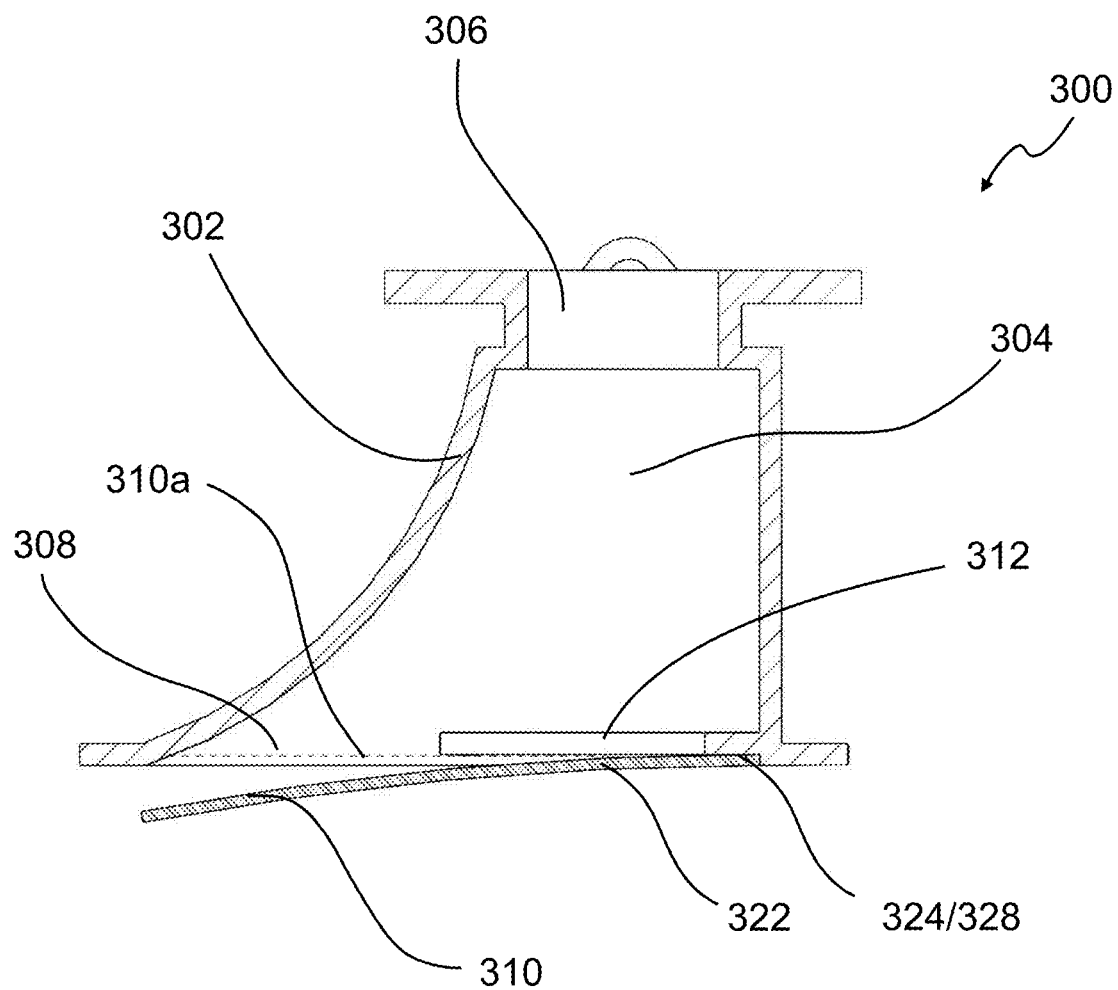
FIG. 8B illustrates a cross-sectional side view of the nozzle system assembly of the nozzle system, similar to that in FIG. 7B, with a reed-type flap.
Figure 8C:
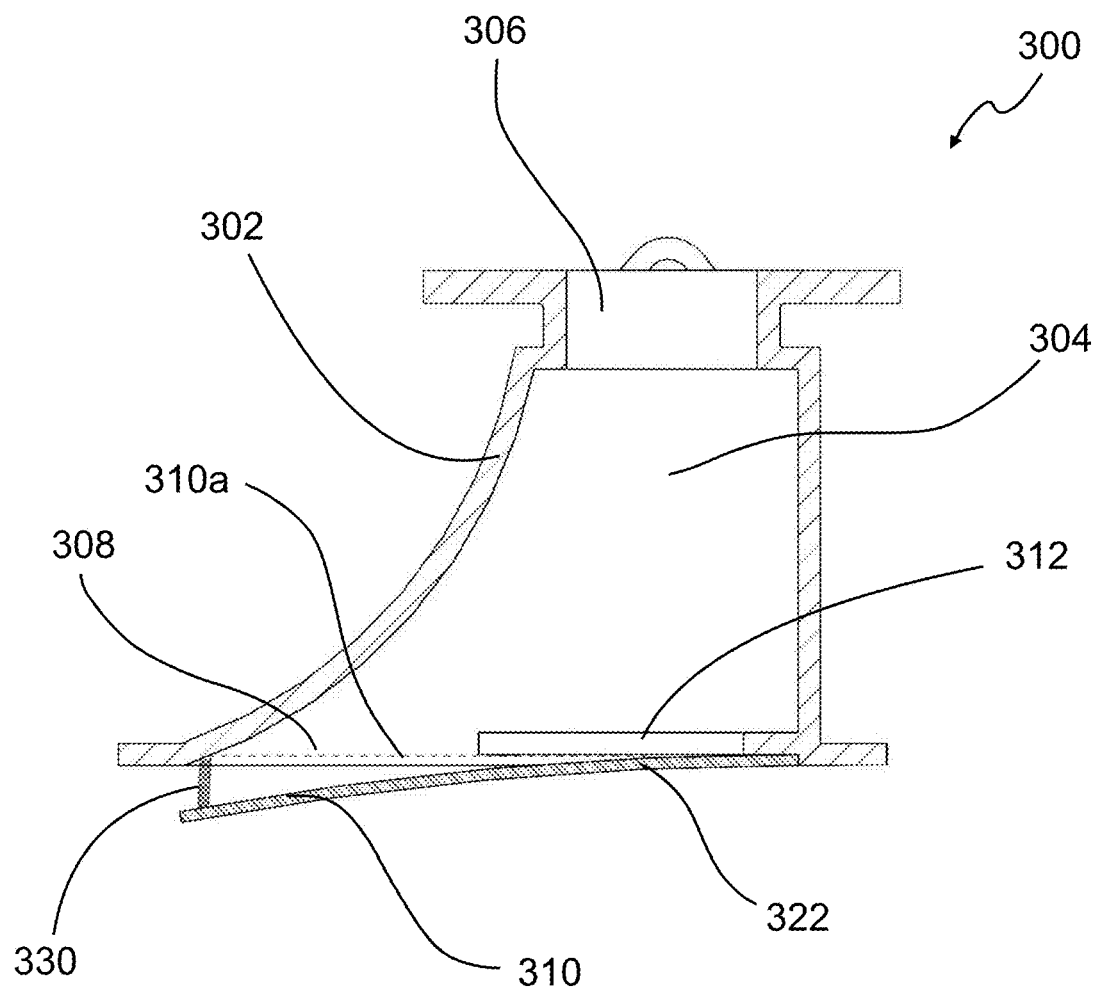
FIG. 8C illustrates a cross-sectional side view of the nozzle system assembly of the nozzle system, similar to that in FIG. 7B, with a spring-assisted reed-type flap.

FIG. 8A illustrates a cross-sectional side view of the nozzle system assembly 300 of the nozzle system, similar to that in FIG. 7B, with a counterweight-type flap 310. The counterweight 326 can be seen in both open position, with the closed position of the counterweight 326a and flap 310a shown in phantom. FIG. 8B illustrates a cross-sectional side view of the nozzle system assembly 300 of the nozzle system, similar to that in FIG. 7B, with a reed-type flap 310. A characteristic of the reed-valve 322 construction is the mount without a means to return the flap to its original position, aside from its own internal elasticity. Positioning of the closed flap 310a is shown in phantom. FIG. 8C illustrates another embodiment with the cross-sectional side view of the nozzle system assembly 300 of the nozzle system, similar to that in FIG. 7B, with a spring-assisted reed-type flap 322. The spring 330 can be seen in a stretched state, which will contract when the flap 310 closes, as may be appreciated from the flap 310a shown in phantom. Opening 308, mounting bracket 312, internal cavity 304, and gas inlet 306 can also be seen in FIGS. 8A-8C. FIGS. 7C-8C further demonstrate the potential flex of the flap 310.

Figures 9A, 9B, 9C, 9D:
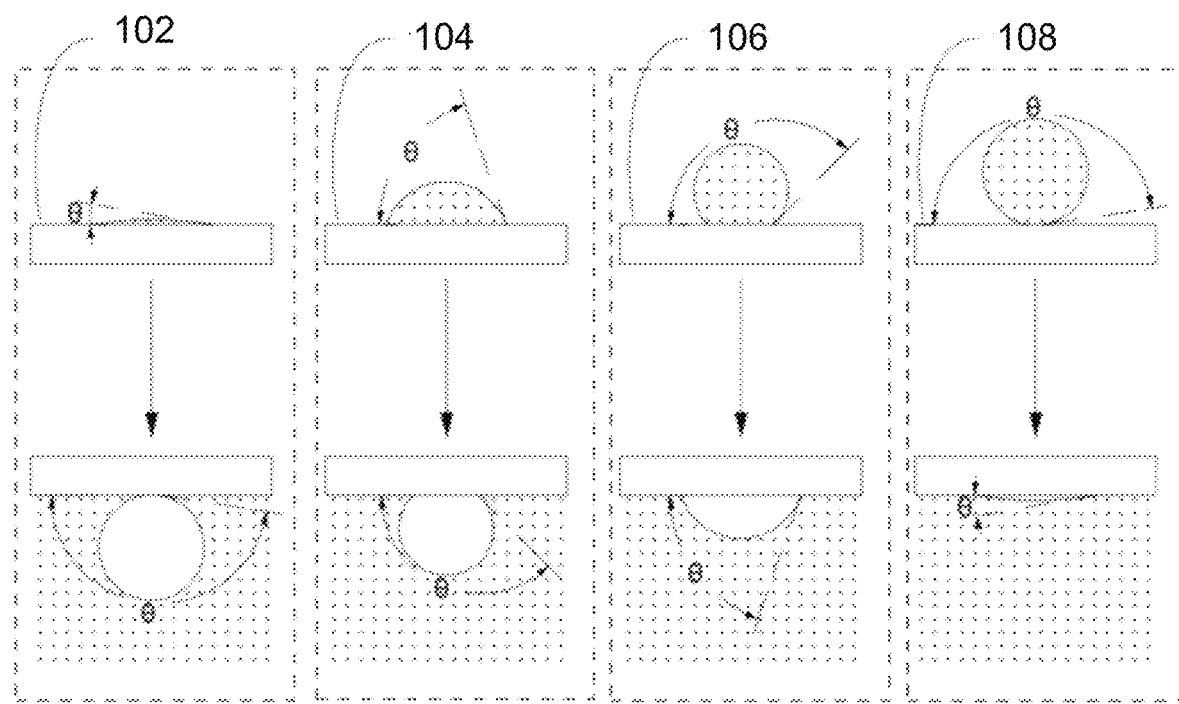
FIG. 9A illustrates a conceptual view of a surface that is superhydrophilic when in air and superaerophobic when in water.
FIG. 9B illustrates a conceptual view of a surface that is hydrophilic when in air and aerophobic when in water.
FIG. 9C illustrates a conceptual view of a surface that is hydrophobic when in air and aerophilic when in water.
FIG. 9D illustrates a conceptual view of a surface that is superhydrophobic when in air and superaerophilic when in water

FIGS. 9A-9D illustrate the concept of contact angle as it relates to the aerophilicity and hydrophobicity of a surface. FIG. 9A shows a surface that is superhydrophilic 102 when in air and superaerophobic when in water. In the top drawing, the contact angle of the water droplet on the surface surrounded by air is $\theta<5°$. In the bottom drawing, the contact angle of the air pocket on the same surface surrounded by water is $\theta>150°$. FIG. 9B shows a surface that is hydrophilic 104 when in air and aerophobic when in water. In the top drawing, the contact angle of the water droplet on the surface surrounded by air is $5°<\theta<90°$. In the bottom drawing, the contact angle of the air pocket on the same surface surrounded by water is $90°<\theta<150°$. FIG. 9C shows a surface that is hydrophobic 106 when in air and aerophilic when in water. In the top drawing, the contact angle of the water droplet on the surface surrounded by air is $90°<\theta<150°$. In the bottom drawing, the contact angle of the air pocket on the same surface surrounded by water is $5°<\theta<90°$. FIG. 9D shows a surface that is superhydrophobic 108 when in air and superaerophilic when in water. In the top drawing, the contact angle of the water droplet on the surface surrounded by air is $\theta>150°$. In the bottom drawing, the contact angle of the air pocket on the same surface surrounded by water is $\theta<5°$.

Figure 10A:
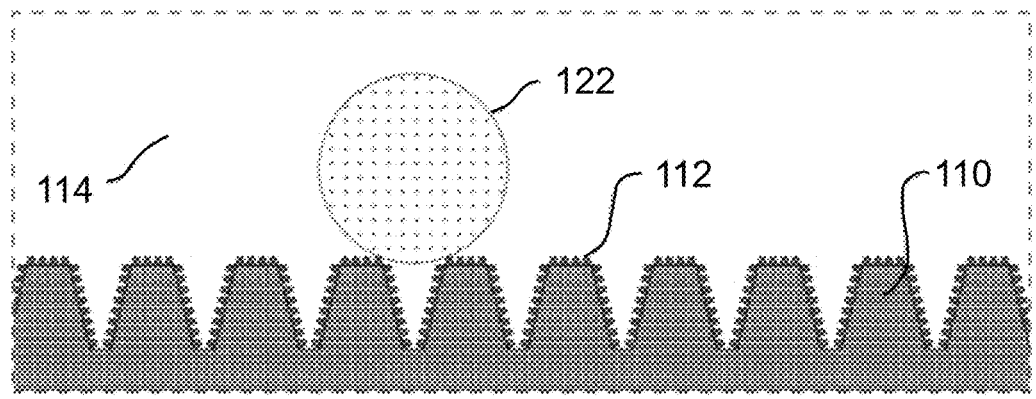
FIG. 10A illustrates an enlarged, not-to-scale, cross-sectional side view of the superaerophilic surface sitting in air.
Figure 10B:
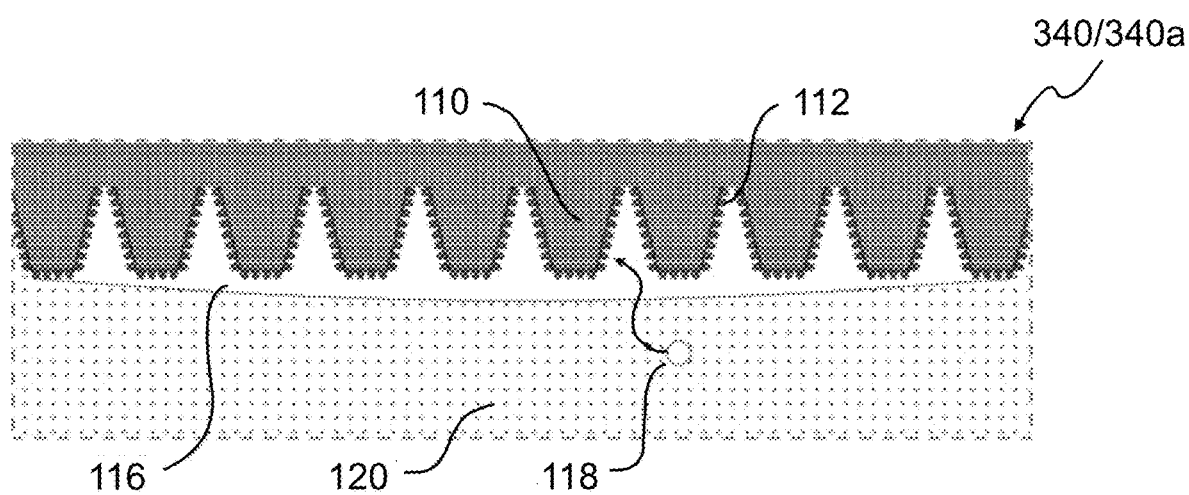
FIG. 10B illustrates an enlarged, not-to-scale, cross-sectional side view of the superaerophilic surface sitting in water.

FIGS. 10A-10B illustrate a not-to-scale representation of the laser-ablated alloy's surface topography with structures created at the microscopic and nanoscopic scale, which creates a superaerophilic surface. FIG. 10A shows this surface sitting in air, while FIG. 10B shows this surface surrounded by water. As may be appreciated in FIGS. 10A-10B, shown are the microscopic-scaled ridges 110 left after creating laser ablated grooves, nanoscopic-scaled structures 112 induced by the laser, air 114 in which the embodiment shown in FIG. 10A sits, the created air plastron 116, air bubble 118 that can penetrate the microscopic and nanoscopic-scaled surface and repel water, and water 120 in which the embodiment shown in FIG. 10B sits. The air plastron 116 shown in the figures also include an engaged air layer that engages above the micro-bubbles within the functional surface. In addition, further shown are water droplets 122 sitting on top of the surface surrounded by air. The water droplet 122 in this form has very little interface with the surface, minimizing the wetting of the surface. The air within the grooves helps keep the water from penetrating them.

Figure 11A:
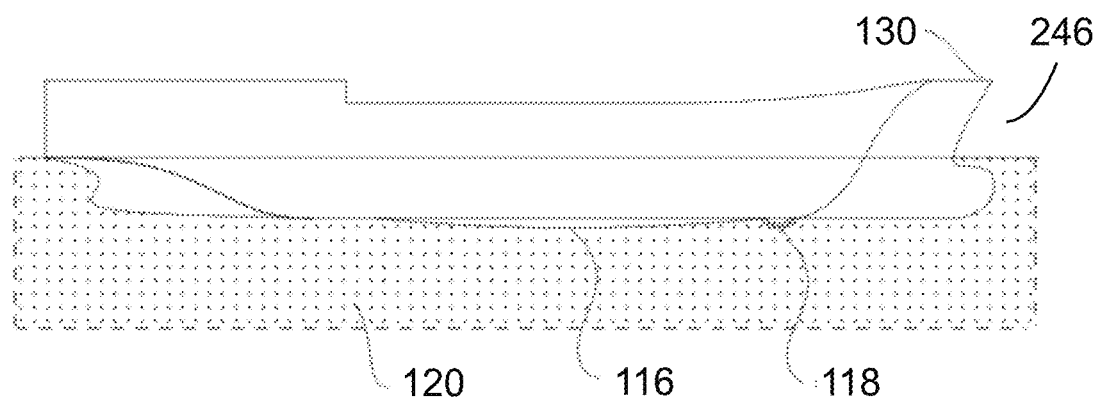
FIG. 11A illustrates a conceptual profile view of a ship using air lubrication with a superaerophilic surface covering part of its bottom.
Figure 11B:
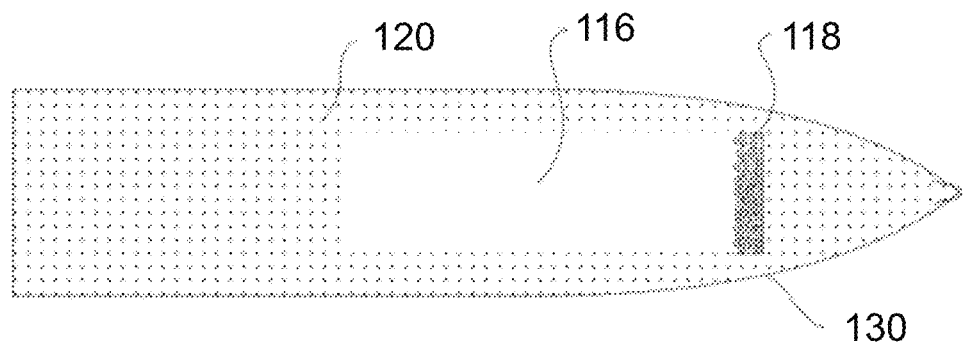
FIG. 11B illustrates a conceptual plan view of a ship using air lubrication with a superaerophilic surface covering part of its bottom.

FIG. 11A shows a profile view and a FIG. 11B shows a plan view of a ship using air lubrication with a superaerophilic surface covering part of its bottom. The air, after initially being injected, wants to remain attached to the superaerophilic surface of the hull. As may be appreciated in FIGS. 11A-11B, shown are the ship's hull 601, the air bubbles 118 released at the air injection, the air 116 attached to the hull 130 over the area covered by the superaerophilic surface, and the surrounding water 120.

Figure 12A:
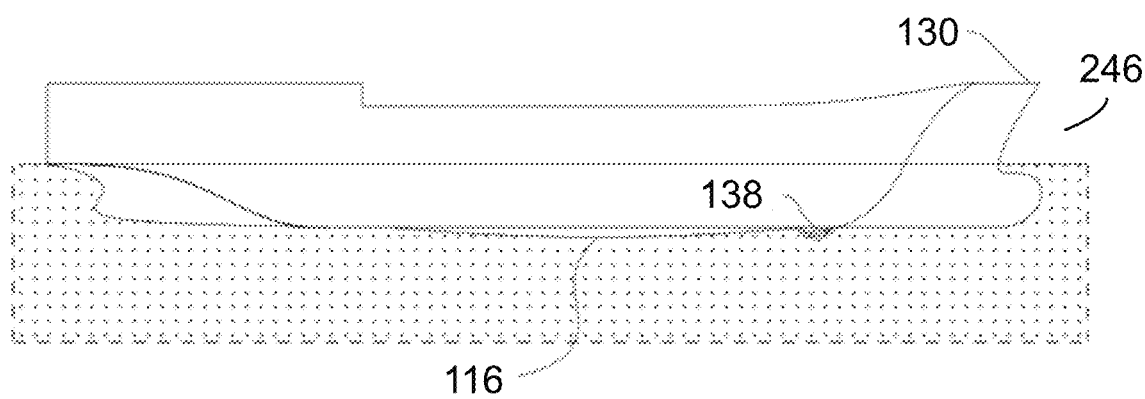
FIG. 12A illustrates a conceptual profile view of a ship using air lubrication with a superaerophilic surface covering part of its bottom.
Figure 12B:
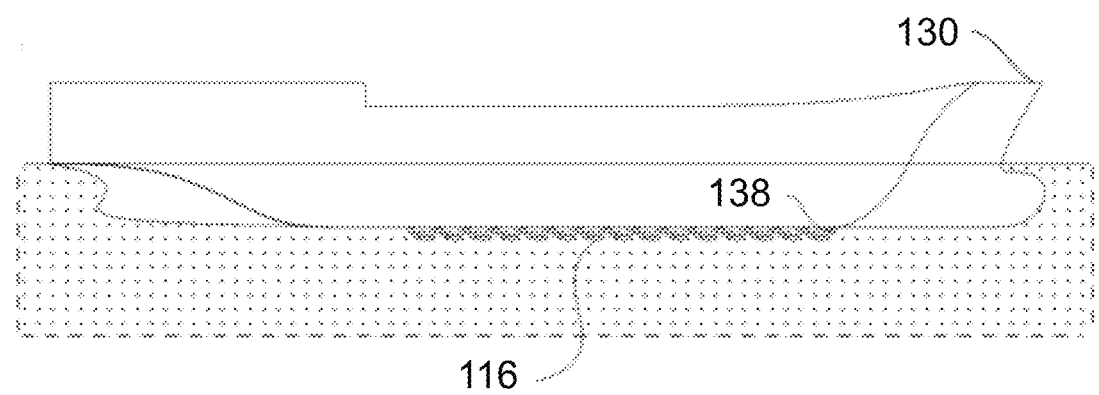
FIG. 12B illustrates a conceptual profile view of a ship using an air lubrication system on an aerophobic hull.

FIG. 12A shows an air lubrication system used on a vessel with a superaerophilic surface, and FIG. 12B shows an air lubrication system on an aerophobic hull. As may be appreciated in FIGS. 12A-12B, shown are the ship's hull 130, the air injection site 138, the sustained air plastron 116 on the hull 130 with a superaerophilic surface, and air bubbles 118 bouncing off a hull using air lubrication over a traditional bottom.

Figure 13A:
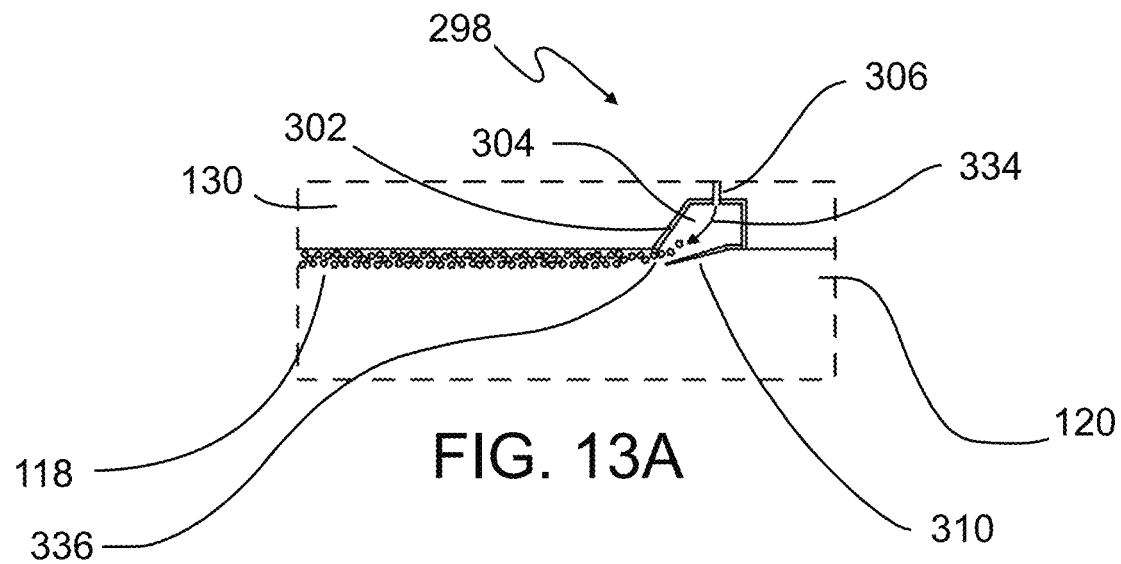
FIG. 13A illustrates a conceptual cross-sectional side view of a nozzle system installed flush into the hull of a watercraft with open flap.
Figure 13B:
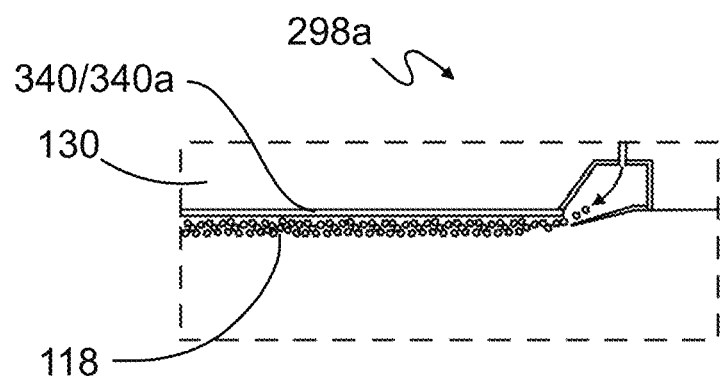
FIG. 13B illustrates a conceptual cross-sectional side view of a nozzle system installed flush into the hull of a watercraft with open flap, with a hull coated in a superaerophilic layer.

FIG. 13A illustrates a conceptual cross-sectional side view of a nozzle 298 system installed flush into the hull 130 of a watercraft with open flap 310. The gaseous flow 334 can be seen coming into the open cavity 304 of the main body 302 from the gas flow inlet 306. This gaseous flow 334 pushes on the flap 310, thereby creating a longitudinal opening 336 expelling the gas bubbles 118. The bubbles 118 are seen accumulating under the marine craft's hull 130. Similar to FIG. 13A, FIG. 13B illustrates a conceptual cross-sectional side view of a nozzle 298 system installed flush into the hull 130 of a watercraft with open flap 310. However, FIG. 13B also shows the addition of a hull 130 coated in a superaerophilic inducing layer 340.

Figure 14:
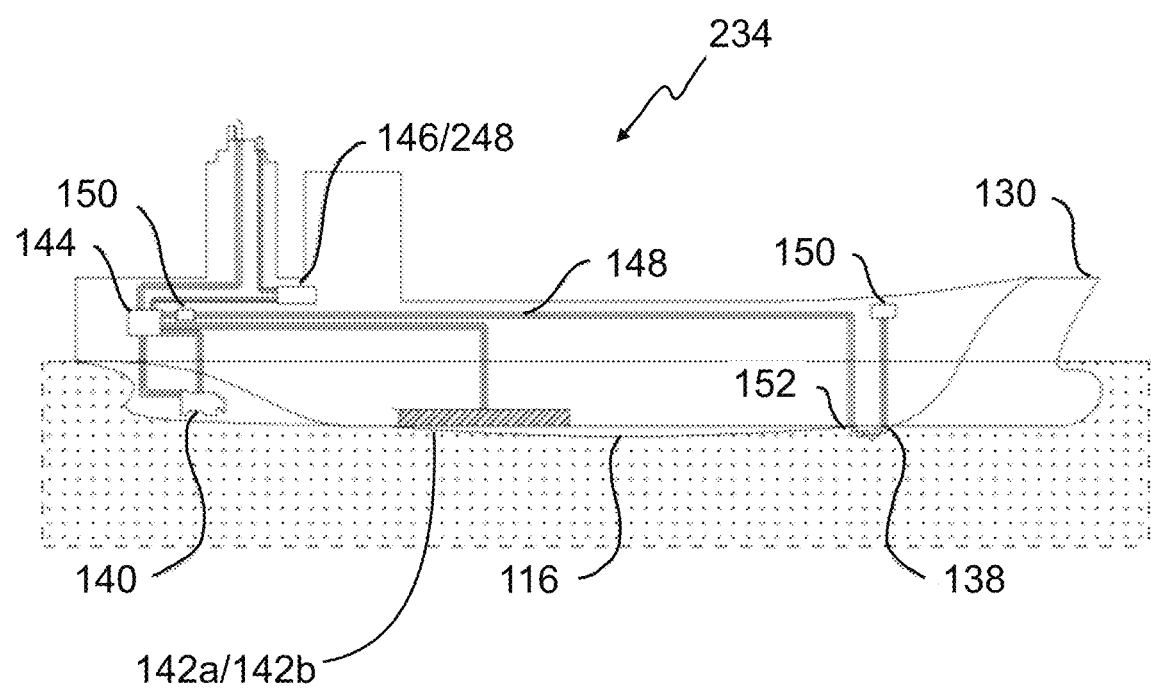
FIG. 14 illustrates a system for carbon-enriched air lubrication delivery.

FIG. 14 illustrates a simplified system for carbon-enriched air lubrication delivery. As may be appreciated in FIG. 14, shown are the ship's hull 130, the main engine 140, the blackwater tanks/bioreactors 142a/142b, the galley fume system 146, the piping 148 that delivers carbon-enriched air to the Air Plastron Replenishment System, the carbon filter 150, the gas injection site 152 for the carbon-enriched air being delivered to the Functional Surface Assembly's air plastron, a regular air compressor 144/176 for the ship's Air Lubrication System, the air injection site 138 for the air lubrication, and the created air sheet 116 on the ship's hull. Also shown is the air compressor 144, which drives exhaust from the main engine and fumes from the blackwater tanks, bioreactors, and galley to the Air Plastron Replenishment System.

In some embodiments, the air distribution and replenishment system 234 is configured to receive a gaseous supply of carbon from at least one of an external atmosphere 246, engine exhaust 156, black water tank fumes 158a, bioreactor exhaust 158b, and galley hood fumes 158c, whereby the gaseous supply is rerouted from the at least one of external atmosphere 246, engine exhaust 156, black water tank fumes 158a, bioreactor exhaust 158b, and galley hood fumes 158c through a turbocharger 248 to a compressor input 174 in the compressor 144/176, whereby the compressor 144/176 supplies the air distribution and replenishment system 234.

Figure 15:
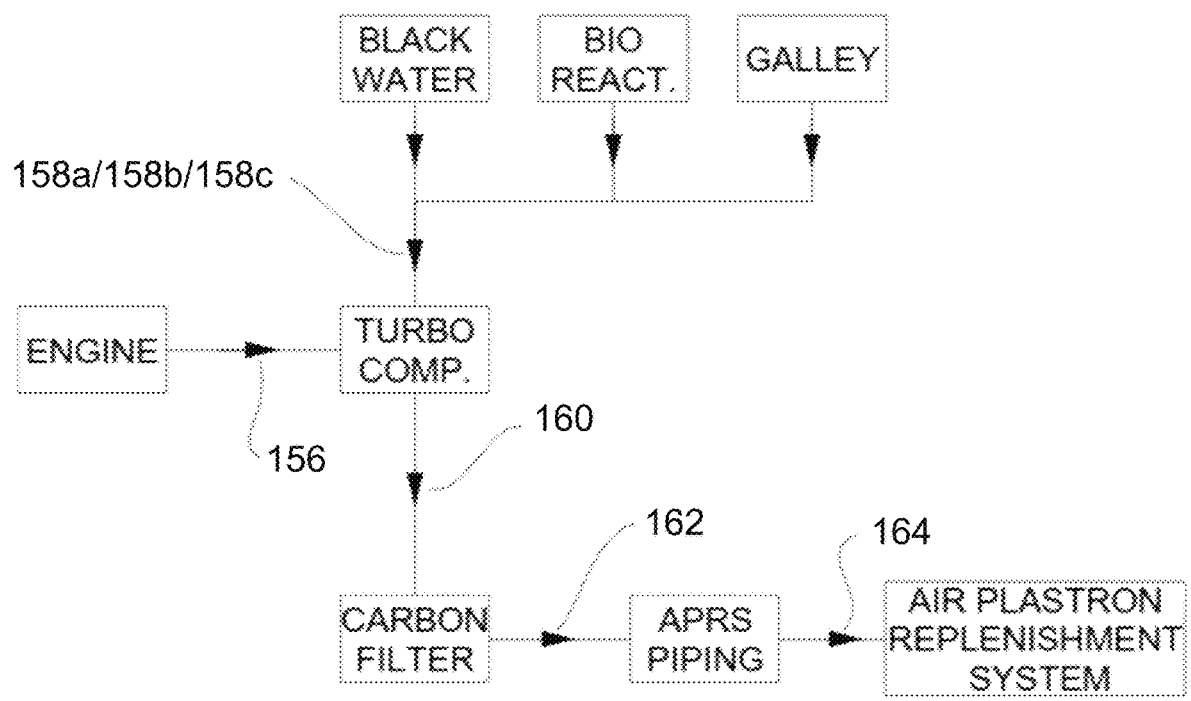
FIG. 15 illustrates a flow chart of the carbon-enrichment process.

FIG. 15 illustrates a flow chart of the carbon-enrichment process. As may be appreciated in FIG. 14, shown are the engine exhaust gas 156, and carbon-rich gases 158a/158b/158c from other shipboard sources: the black water tanks, grey water tanks, and galley. Also shown is a combination of the gases 160 from the carbon-rich gases 158a/158b/158c and the exhaust from the engine exhaust gas 156 that has been moved through a turbo compressor. Further shown is a carbon-enriched air 162 that has passed through a carbon filter, and a carbon-enriched air 164 that is delivered to the bottom of the hull.

In an exemplary embodiment, air lubrication system nozzle assembly 300 is provided. The air lubrication system nozzle assembly 300 includes a main body 302 having an open cavity 304 therein, wherein the main body 302 includes a gas flow inlet 306, and an open lower boundary 308 configured to receive a flow modulating nozzle flap 310. The flow modulating nozzle flap 310 is also provided. The flap 310 is configured to modulate a direction and flow rate of a gaseous flow 334. The main body 302 has at least one longitudinal engagement area 316, whereby the flow modulating nozzle flap 310 may be coupled. A semi-circumferential flap mounting bracket 312 forming an upper containment limit 338 (see, for example, FIG. 7C) for the flow modulating nozzle flap 310 is also provided. The air lubrication system nozzle assembly 300 is operable in a submerged environment.

In the exemplary embodiment, the open lower boundary 308 is flush with the transverse horizontal plane of the submerged hull 130 of a ship surrounding the open lower boundary 308.

In some embodiments, the at least one longitudinal engagement area 316 is a semi-circumferential flap mounting bracket 312 affixed at a border of the open lower boundary 308, as may be appreciated from the hinged flaps in FIGS. 6A and 6B.

In some embodiments, the flow modulating nozzle flap 310 is coupled to the main body at the at least one longitudinal engagement area 316. The at least one longitudinal engagement area 316 is positioned at a forward area 318 to direct flow of water under the flow modulating nozzle flap 310, and provides a surface for hydrodynamic forces to press against to close the flow modulating nozzle flap 310 when no air is being dispensed from the opening 308/336 of the nozzle assembly 300.

In some embodiments, the flow modulating nozzle flap 310 is removably coupled to the main body 302 by a pivot hinge 320 (as may be appreciated in FIG. 7B), allowing the hinge 320 to be uncoupled and the flap 310 to drop out when a change of flap technology is desired. In other embodiments, the flow modulating nozzle flap 310 may be coupled to the main body by affixing a mounting area 324 (as may be appreciated conceptually in FIG. 7C) on an upper surface 328 of the flap 310 to the at least one longitudinal engagement area 316, whereby flexing of the flap 310 is accomplished by the functionality of a living hinge.

In some embodiments, the flow modulating nozzle flap 310 is configured to incorporate self-closing means 322/326/330, whereby when not opened by the downward pressure of escaping gas, the flow modulating nozzle flap 310 is assisted to return to a closed state, as shown in FIGS. 8A-8C, and as may be appreciated by FIGS. 5B and 6B. The self-closing means 322/326/330 may take several forms. In some embodiments, self-closing means of the flow modulating nozzle flap includes a reed valve closure 322, with a mounting area 324 coupled to the semi-circumferential flap mounting bracket 312. In other embodiments, the self-closing means may be a counterweight 326 affixed to an upper surface 328 of the flow modulating nozzle flap 310, configured to pull the flow modulating nozzle flap 310 closed when tipping under its own weight, wherein the flow modulating nozzle flap 310 includes a mounting area 324 coupled to the semi-circumferential flap mounting bracket 312. In further embodiments, the self-closing means of the flow modulating nozzle flap may include a spring-assisted 330 closure.

In some embodiments, the air lubrication system nozzle assembly 300 includes a diffuser panel 332 at the open lower boundary 308, positioned above the flow modulating nozzle flap 310 and configured to a geometric shape of an outline of the open lower boundary 308, whereby the diffuser panel 332 contains a plurality of through-holes 332a to allow air to pass through, while influencing the size of air particles passing through, thereby providing for smaller bubbles. The term "through-holes" is used in its broadest terms, and in some embodiments, the diffuser panel 332 may comprises a mesh material, though it should be appreciated that the diffuser 332 may be several other applicable materials, such as plastic with perforations, or materials incorporated after additional configuration. Such may include soapstone. However, the more difficult a material is to work with, the higher level of configuration and testing it will need to be sustainable as an embodiment. The overall purpose for the diffuser 332 is to separate the flow of gas into individual streams, thereby creating smaller bubbles, which have a greater chance of adhering to the constructed superaerophilic inducing surface 340 to promote forming of an air plastron 116, and thus, promotes the principles of air lubrication under the hull 310 of a ship.

In an exemplary embodiment, air lubrication system through-holes 332a is provided. The air lubrication system 298a includes a superaerophilic inducing surface 340, a nozzle assembly 300, and an air plastron 116 created from the gaseous supply 334 directed through the nozzle assembly 300 when engaged. The superaerophilic inducing surface 340 is mounted at an underside of a hull 130 of a marine craft for use in reducing hydrodynamic drag on the hull 130 of the marine craft. In some embodiments, the superaerophilic inducing surface comprises a metallic surface, wherein the metallic surface has a plurality of superaerophilic inducing microscopic 110 and nanoscopic 112 structures etched within the metallic surface from laser ablation. Also, each superaerophilic inducing microscopic structure 110 defines a trench and a ridge geometry, as may be seen in FIGS. 10A, and 10B, and as may be appreciated from the disclosure of my earlier application, U.S. patent application Ser. No. 18/119,324, entitled "A System and Method for Reducing Drag on Hulls of Marine Crafts Thereby Increasing Fluid Dynamic Efficiencies", incorporated herein in its entirety. Each superaerophilic inducing nanoscopic structure 112 defines a trench and a ridge geometry in a sidewall of each of the superaerophilic inducing microscopic structure 110.

The nozzle assembly 300 is recessed into the hull 130 of the marine craft and configured to disburse a gaseous supply 334 over the superaerophilic inducing surface 340. The nozzle assembly 300 of the system includes a main body 302 having an open cavity 304 therein, wherein the main body 302 includes a gas flow inlet 306, and an open lower boundary 308, configured to receive a flow modulating nozzle flap 310. The flow modulating nozzle flap 310 is provided, wherein the flap 310 is configured to modulate a direction and flow rate of a gaseous flow. The main body 302 has a semi-circumferential flap mounting bracket 312 affixed at a border 314 of the open lower boundary 308, wherein the mounting bracket 312 provides at least one longitudinal engagement area 316, whereby the flow modulating nozzle flap 310 may be hinged. The semi-circumferential flap mounting bracket 312 forms an upper containment limit 338 for the flow modulating nozzle flap 310. An air plastron 116 is created from the gaseous supply directed through the nozzle assembly 300 when engaged.

In another exemplary embodiment of the air lubrication system 298a, the system includes a superaerophilic inducing surface 340 mounted at an underside of a hull 130 of a marine craft for use in reducing hydrodynamic drag on said hull 130 of said marine craft, and a nozzle assembly 300 recessed into said hull 130 of said marine craft and configured to disburse a gaseous supply 334 over said superaerophilic inducing surface 340. The superaerophilic inducing surface 340 comprises a functional surface 340a, wherein the functional surface 340a has a plurality of superaerophilic inducing microscopic 110 and nanoscopic structures 112 constructed within said functional surface 340a from imprinting the surface 340.

In some embodiments, the functional surface 340a is imprinted into a metallic material, in other embodiments, the functional surface 340a is imprinted into a polymer material, and in yet further embodiments, the functional surface 340a is imprinted onto a coating on a material. Imprinting of the nanoscopic 112 and microscopic structures 110 of the functional surface 340a may be constructed by using laser ablation, drilling, punching, pressing, or a combination thereof into a subject material, typically a pre-altered piece of material, such as a polymer, metal, composite, or the like, of the functional surface 340a.

In another exemplary embodiment, a method for providing air to an underside of a marine craft's submerged hull 130 is provided. The method includes providing an air lubrication nozzle assembly 300 capable of being immersed continuously in a liquid. The air lubrication system nozzle assembly 300 includes a main body 302 having an open cavity 304 therein, wherein the main body 304 includes a gas flow inlet 306, and an open lower boundary 308 configured to receive a flow modulating nozzle flap 310. The air lubrication system nozzle assembly 300 also includes a flow modulating nozzle flap 310, wherein the flap 310 is configured to modulate a direction and flow rate of a gaseous flow 334. The main body has at least one longitudinal engagement area 316, whereby the flow modulating nozzle flap 310 may be coupled. The semi-circumferential flap mounting bracket 312 forms an upper containment limit 338 for the flow modulating nozzle flap 310. As such, the air lubrication system nozzle assembly 300 is operable in a submerged environment.

In some embodiments, the method for providing air to an underside of a marine craft's submerged hull further comprises configuring portions of a ship's hull 130 for air delivery to a constructed superaerophilic surface 340 by providing at least one flush-installed linear nozzle 300, wherein each of the at least one flush-installed linear nozzle 300 is the air lubrication nozzle assembly 300. Each nozzle 300 in the at least one flush-installed linear nozzle is recessed up into the ship's hull 130.

In some embodiments, the air lubrication nozzle assembly 300 is capable of performing the steps of passively lowering and raising the flow modulating nozzle flap 310. Lowering the flow modulating nozzle flap 310 is achieved by using a flow of gas 334 received from the gas flow inlet 306 to lower the flow modulating nozzle flap 310, wherein a flow of gas 334 disburses uniformly in the open cavity 304 of the main body, thereby pressing on the flow modulating nozzle flap 310 to allow air bubbles 118 to disburse to an underside of a marine craft's hull 130, when air is required under the marine craft's hull 130. Raising the flow modulating nozzle flap 310 is achieved by terminating a flow of gas received from the gas flow inlet 306, whereby a passive lifting system is incorporated into the flow modulating nozzle flap 310 to allow for self-closure when the air is no longer required under the marine craft's hull 130. It should be appreciated that the air compressor 144 must produce a pressure greater than the hydrodynamic pressure acting on the underside of the flap 310, typically by at least a few psi.

Self-closing may be achieved by using one of several passive closing means 322/326/330, or a combination and/or variations and/or equivalents thereof. Some embodiments may include configuring the passive lifting system incorporated into the flow modulating nozzle flap 310 to allow for self-closure when the air is no longer required under the marine craft's hull 130 by incorporating a reed valve closure 322, with a mounting area 324 coupled to the semi-circumferential flap mounting bracket 312. However, other embodiments may include configuring the passive lifting system incorporated into the flow modulating nozzle flap 310 to allow for self-closure when the air is no longer required under the marine craft's hull 130 by incorporating a counterweight 326 affixed to an upper surface 328 of the flow modulating nozzle flap 310, thereby configuring the counterweight 326 to pull the flow modulating nozzle flap 310 closed when tipping under its own weight, wherein the flow modulating nozzle flap 310 includes a mounting area 324 coupled to the semi-circumferential flap mounting bracket 312. Lastly, some embodiments may include configuring the passive lifting system incorporated into the flow modulating nozzle flap 310 to allow for self-closure when the air is no longer required under the marine craft's hull 130 by incorporating a spring-assisted closure 330.

In some embodiments of the method for providing air to an underside of a marine craft's submerged hull 130, the method further comprises providing a diffuser panel 332. This embodiment includes configuring the diffuser panel 332 to a geometric shape of an outline of the open lower boundary 314 to provide smaller bubbles to an underside of a marine craft hull 130, whereby the diffuser panel 332 contains a plurality of through-holes 332a to allow air to pass through, while influencing the size of air particles passing through. The embodiment of the method also includes positioning the diffuser panel 332 above the flow modulating nozzle flap 310 at the open lower boundary 308.

While the preferred embodiment of the present invention has been described above, it is to be appreciated that the invention may be embodied otherwise than is herein specifically shown and described, and that certain changes may be made in the form and arrangement of the parts without departing from the underlying ideas or principles of this invention as set forth in the Claims appended herewith.

I claim:

1. An air lubrication system nozzle assembly, comprising:
   a sea chest having an open cavity therein, wherein said sea chest includes a gas flow inlet, and an open lower boundary configured to receive a flow modulating nozzle flap;
   a flow modulating nozzle flap, wherein said flap is configured to modulate a direction and flow rate of a gaseous flow;
   said sea chest having at least one longitudinal engagement area, wherein said at least one longitudinal engagement area is a rigidly fixed semi-circumferential bracket for mounting said flow modulating nozzle flap, wherein said rigidly fixed semi-circumferential bracket is affixed semi-circumferentially at a border of said open lower boundary;
   said flow modulating nozzle flap is coupled to said at least one longitudinal engagement area; and
   wherein said air lubrication system nozzle assembly is operable in a submerged environment.

2. The air lubrication system nozzle assembly, as recited in claim 1, wherein said rigidly fixed semi-circumferential bracket forms an upper containment limit for said flow modulating nozzle flap.

3. The air lubrication system nozzle assembly, as recited in claim 1, wherein said flow modulating nozzle flap is coupled to said sea chest at said at least one longitudinal engagement area, wherein said at least one longitudinal engagement area is positioned at a forward area to direct flow of water under the flow modulating nozzle flap, and provide a surface for hydrodynamic forces to press against to close said flow modulating nozzle flap when no air is being dispensed from the opening of the nozzle assembly.

4. The air lubrication system nozzle assembly, as recited in claim 1, wherein said flow modulating nozzle flap is removably coupled to said sea chest by a pivot hinge.

5. The air lubrication system nozzle assembly, as recited in claim 1, wherein said flow modulating nozzle flap is coupled to said sea chest by affixing a mounting area on an upper surface of said flap to said at least one longitudinal engagement area.

6. The air lubrication system nozzle assembly, as recited in claim 1, wherein said flow modulating nozzle flap is configured to incorporate self-closing means, whereby when not opened by the downward pressure of escaping gas, said flow modulating nozzle flap is assisted to return to a closed state.

7. The air lubrication system nozzle assembly, as recited in claim 6, wherein said self-closing means of said flow modulating nozzle flap includes a reed valve closure, with a mounting area coupled to said rigidly fixed semi-circumferential bracket.

8. The air lubrication system nozzle assembly, as recited in claim 6, wherein said self-closing means of said flow modulating nozzle flap is a counterweight affixed to an upper surface of said flow modulating nozzle flap, configured to pull said flow modulating nozzle flap closed when tipping under its own weight, wherein said flow modulating nozzle flap includes a mounting area coupled to said fixed semi-circumferential bracket.

9. The air lubrication system nozzle assembly, as recited in claim 6, wherein said self-closing means of said flow modulating nozzle flap includes a spring-assisted closure.

10. An air lubrication system nozzle assembly, comprising:
- a main body having an open cavity therein, wherein said main body includes a gas flow inlet, and an open lower boundary configured to receive a flow modulating nozzle flap;
- a flow modulating nozzle flap, wherein said flap is configured to modulate a direction and flow rate of a gaseous flow;
- said main body having at least one longitudinal engagement area, wherein said at least one longitudinal engagement area is a rigidly fixed semi-circumferential bracket for mounting said flow modulating nozzle flap, wherein said rigidly fixed semi-circumferential bracket is affixed semi-circumferentially at a border of said open lower boundary:
- said flow modulating nozzle flap is coupled to said at least one longitudinal engagement area;
- wherein said air lubrication system nozzle assembly is operable in a submerged environment; and
- a diffuser panel at said open lower boundary, positioned above said flow modulating nozzle flap and configured to a geometric shape of an outline of said open lower boundary, whereby said diffuser panel contains a plurality of through-holes to allow air to pass through, while influencing the size of air particles passing through, thereby providing for smaller bubbles.

11. The air lubrication system nozzle assembly, as recited in claim 10, wherein said diffuser panel comprises a mesh material.

12. An air lubrication system, comprising:
- a superaerophilic inducing surface mounted at an underside of a hull of a marine craft for use in reducing hydrodynamic drag on said hull of said marine craft, comprising:
  - a functional surface; and
  - said functional surface having a plurality of superaerophilic inducing microscopic and nanoscopic structures constructed within said functional surface from imprinting the surface;
- a nozzle assembly recessed into said hull of said marine craft and configured to disburse a gaseous supply over said superaerophilic inducing surface, wherein said nozzle assembly includes:
  - a main body having an open cavity therein, wherein said main body includes a gas flow inlet, and an open lower boundary, configured to receive a flow modulating nozzle flap;
  - a flow modulating nozzle flap, wherein said flap is configured to modulate a direction and flow rate of a gaseous flow;
  - said main body having a semi-circumferential flap mounting bracket affixed semi-circumferentially at a border of said open lower boundary, wherein said mounting bracket provides at least one longitudinal engagement area, whereby said flow modulating nozzle flap is hinged to said at least one longitudinal engagement area; and
  - said semi-circumferential flap mounting bracket forming an upper containment limit for said flow modulating nozzle flap; and
- an engaged air layer created from said gaseous supply directed through said nozzle assembly when pressurized.

13. The air lubrication system, as recited in claim 12, wherein each superaerophilic inducing microscopic structure of said plurality of superaerophilic inducing microscopic and nanoscopic structures of said functional surface defines a trench and a ridge geometry.

14. The air lubrication system, as recited in claim 12, wherein each superaerophilic inducing nanoscopic structure of said plurality of superaerophilic inducing microscopic and nanoscopic structures defines a trench and a ridge geometry in a sidewall of each of said superaerophilic inducing microscopic structure.

15. The air lubrication system, as recited in claim 12, wherein the functional surface is imprinted into a metallic material.

16. The air lubrication system, as recited in claim 12, wherein the functional surface is imprinted into a polymer material.

17. The air lubrication system, as recited in claim 12, wherein the functional surface is imprinted onto a coating on a material.

18. The air lubrication system, as recited in claim 12, wherein said imprinting of said nanoscopic and microscopic structures of the functional surface is constructed by using laser ablation, drilling, punching, pressing, or a combination thereof into a subject material of the functional surface.

19. A method for providing air to an underside of a marine craft's submerged hull, comprising:
- configuring portions of a ship's hull for air delivery to said ship's hull's lower surface by providing at least one flush-installed linear nozzle, wherein each of said at least one flush-installed linear nozzle is an air lubrication nozzle assembly;
- providing said air lubrication nozzle assembly, wherein said air lubrication nozzle assembly is capable of being immersed continuously in a liquid, and said air lubrication system nozzle assembly includes:
  - a main body having an open cavity therein, wherein said main body includes a gas flow inlet, and an open lower boundary configured to receive a flow modulating nozzle flap, wherein said open lower boundary is flush with a transverse horizontal plane of a submerged hull of a ship surrounding said open lower boundary;
  - a flow modulating nozzle flap movably coupled to the open lower boundary of the main body, wherein said flap is configured to modulate a direction and flow rate of a gaseous flow;
  - said main body having at least one longitudinal engagement area, whereby said flow modulating nozzle is coupled to said at least one longitudinal engagement area;
  - wherein said air lubrication system nozzle assembly is operable in a submerged environment; and
- wherein the main body of each nozzle in said at least one flush-installed linear nozzle is recessed up into the ship's hull.

20. The method for providing air to an underside of a marine craft's submerged hull, as recited in claim 19, wherein said air lubrication system nozzle assembly in said step of providing said air lubrication nozzle assembly capable of being immersed continuously in a liquid, further includes a semi-circumferential bracket for mounting said flow modulating nozzle flap, forming an upper containment limit for said flow modulating nozzle flap.

21. The method for providing air to an underside of a marine craft's submerged hull, as recited in claim 19, further comprising:
- configuring portions of said ship's hull with a constructed superaerophilic surface.

22. The method for providing air to an underside of a marine craft's submerged hull as recited in claim 19, wherein the air lubrication nozzle assembly is capable of performing the steps of:

lowering said flow modulating nozzle flap by using a flow of gas received from said gas flow inlet to lower said flow modulating nozzle flap, wherein a flow of gas disburses uniformly in the open cavity of the main body, thereby pressing on said flow modulating nozzle flap to allow air bubbles to disburse to an underside of a marine craft's hull, when air is required under said marine craft's hull; and raising said flow modulating nozzle flap by terminating a flow of gas received from said gas flow inlet, whereby a passive lifting system is incorporated into the flow modulating nozzle flap to allow for self-closure when said air is no longer required under said marine craft's hull.

23. The method for providing air to an underside of a marine craft's submerged hull as recited in claim 22, further comprising:

configuring said passive lifting system incorporated into the flow modulating nozzle flap to allow for self-closure when said air is no longer required under said marine craft's hull by incorporating a reed valve closure, with a mounting area coupled to a fixed semi-circumferential bracket.

24. The method for providing air to an underside of a marine craft's submerged hull as recited in claim 22, further comprising:

configuring said passive lifting system incorporated into the flow modulating nozzle flap to allow for self-closure when said air is no longer required under said marine craft's hull by incorporating a counterweight affixed to an upper surface of said flow modulating nozzle flap, thereby configuring said counterweight to pull said flow modulating nozzle flap closed when tipping under its own weight, wherein said flow modulating nozzle flap includes a mounting area coupled to a fixed semi-circumferential bracket.

25. The method for providing air to an underside of a marine craft's submerged hull as recited in claim 22, further comprising:

configuring said passive lifting system incorporated into the flow modulating nozzle flap to allow for self-closure when said air is no longer required under said marine craft's hull by incorporating a spring-assisted closure.

26. The method for providing air to an underside of a marine craft's submerged hull as recited in claim 19, further comprising:

providing a diffuser panel;

configuring said diffuser panel to a geometric shape of an outline of said open lower boundary to provide smaller bubbles to an underside of a marine craft, whereby said diffuser panel contains a plurality of through-holes to allow air to pass through, while influencing the size of air particles passing through; and positioning said diffuser panel above said flow modulating nozzle flap at said open lower boundary.

\* \* \* \* \*